United States Patent [19]
Mak et al.

[11] Patent Number: 5,255,334
[45] Date of Patent: Oct. 19, 1993

[54] DIRECTIONAL COUPLER TYPE OPTICAL DEVICE AND A DRIVING METHOD THEREFOR

[75] Inventors: Hon-Ming Mak, Ichihara; Hisaharu Yanagawa, Tokyo, both of Japan

[73] Assignee: The Furukawa Electric Co., Ltd., Tokyo, Japan

[21] Appl. No.: 891,411

[22] Filed: May 29, 1992

[30] Foreign Application Priority Data

Jun. 3, 1991 [JP] Japan ................................ 3-131163
Jun. 3, 1991 [JP] Japan ................................ 3-131164
Jun. 7, 1991 [JP] Japan ................................ 3-136289
Jun. 7, 1991 [JP] Japan ................................ 3-136290

[51] Int. Cl.$^5$ .............................................. G02B 6/10
[52] U.S. Cl. ........................................ 385/41; 385/8; 385/9; 385/21; 385/22; 385/40
[58] Field of Search .................. 385/8, 9, 21, 22, 30, 385/40, 41, 42, 50, 51

[56] References Cited

U.S. PATENT DOCUMENTS

| | | | |
|---|---|---|---|
| 4,012,113 | 3/1977 | Kogelnik et al. | 385/41 |
| 4,157,860 | 6/1979 | Marcatili | 385/9 |
| 4,291,939 | 9/1981 | Giallorenzi et al. | 385/9 |
| 4,865,408 | 9/1989 | Korotky | 385/9 |
| 4,917,449 | 4/1990 | Granestrand | 385/41 |
| 5,066,086 | 11/1991 | Angenent et al. | 385/41 |

OTHER PUBLICATIONS

IEEE Photonics Technology Letters, vol. 3, No. 1, Jan. 1991, High Extinction Guided-Wave Optical Polarization Splitter, H. Mak et al.
Optotechnology Laboratory, Furukawa Electric Co., Ltd. High Extinction Guided-Wave Devices Using Directional Coupler, H. Mak et al, 1990, pp. 525-528.
P. Granestrand et al, Technical Digest, Integrated & Guide-Wave Optics, 1986.
1990 Autumn National Meeting C-216 of Institute of Electronic and Communication Engineers of Japan by H. M. Mak, et al.
1991 Spring National Meeting C-224 of the Institute of Electronic Intelligence and Communication Engineers of Japan, Mak et al.
Article entitled· "On The Crosstalk of Reversed $-\Delta\beta$ Directional Coupler Switches", by Talal K. Findakly, published in Journal of Lightwave Technology, vol. 6, No. 1, Jan. 1988, pp. 36-40.
Article entitled "High Extinction Guided-Wave Devices Using Directional Coupler", by Hon-Ming Mak, et al, published in 17th European Conference on Optical Communication (ECOC '91), Sep., 1991, pp. 525-528.
Patent Abstracts of Japan, vol. 14, No. 551 (P-1139), Dec. 1990-JP-A-02 235 030 (Sumitomo Electric) Sep. 18, 1990.
Patent Abstracts of Japan, vol. 12, No. 401 (P-776), Oct. 1988-JP-A-63 142 333 (Oki Electric) Jun. 14, 1988.

*Primary Examiner*—Frank Gonzalez
*Attorney, Agent, or Firm*—Frishauf, Holtz, Goodman & Woodward

[57] ABSTRACT

A 1-input/2-output or 2-input/2-output directional coupler type optical device comprising a junction including two optical waveguides arranged parallel to each other and each fitted with an electrode for controlling a propagation constant, the incidence end or ends of one or both of the optical waveguides being connected to curved or straight optical waveguides, thus forming an incidence-side lead section, and the respective emergence ends of the two optical waveguides being optically connected to curved or straight optical waveguides, thus forming an emergence-side lead section. An electrode for suppressing the mode coupling is mounted on each optical waveguide of the emergence- or incidence-side lead section. A high extinction ratio of 30 dB or more can be obtained in either of cross and through modes by activating a required one of the mode coupling suppressing electrodes while applying an electrical signal to each propagation constant control electrode.

26 Claims, 13 Drawing Sheets

PRIOR ART

F I G. 14
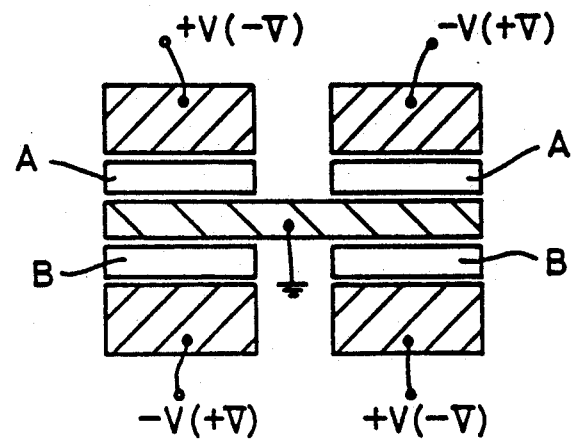
F I G. 15
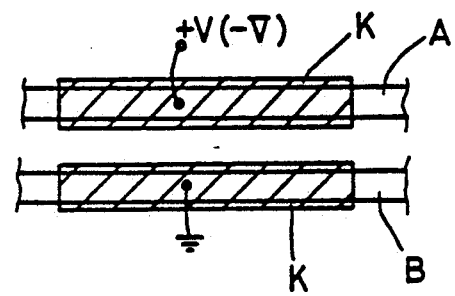
F I G. 16
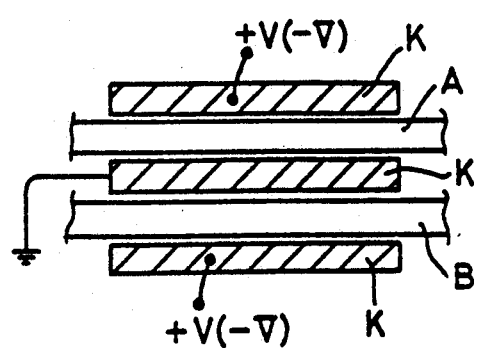

DIRECTIONAL COUPLER TYPE OPTICAL DEVICE AND A DRIVING METHOD THEREFOR

BACKGROUND OF THE INVENTION

The present invention relates to a directional coupler type optical device of a novel construction and a driving method therefor, and more particularly, to a directional coupler type optical device, capable of enjoying a high extinction ratio when used as an optical switch, polarizing splitter, optical modulator, light-wave divisional multiplexer, etc., and a driving method therefor.

Recently, various optical devices having a directional coupler of a waveguide type have been developed, and optical switches, polarizing splitters, optical modulators, light-wave divisional multiplexers, etc. using these devices have been proposed.

FIGS. 1 and 2 show examples of plane patterns of conventional optical devices of a directional coupler type. The device shown in FIG. 1 is a 2-input/2-output device, while the device shown in FIG. 2 is a 1-input/2-output device.

In FIG. 1, a junction C0 of a length L is formed by arranging two optical waveguides A and B of equal widths W close to each other in parallel relation, with a distance G for evanescent coupling between them.

Curved optical waveguides D1, D2, D3 and D4 with a path width W and curvature radius R are optically connected to the respective incidence ends A1 and B1 and emergence ends A2 and B2 of the optical waveguides A and B of the junction C0, respectively, thus forming an incidence-side lead section C1 and an emergence-side lead section C2. Also, straight optical waveguides E1, E2, E3 and E4 with the path width W are optically connected to the curved optical waveguides D1, D2, D3 and D4, respectively, and a distance GF is kept between the respective path-width centers of each corresponding two of the waveguides E1 to E4. Electrodes F1, F2, F3 and F4 are mounted on the optical waveguides A and B of the junction C0. The electrodes F1 to F4 function as propagation constant control means which controls the propagation constant of the optical waveguides situated individually right under the electrodes for a desired value by introducing specific electrical signals from the electrodes.

If the straight optical waveguide E1 is an incidence port, the straight optical waveguides E3 and E4 connected to the emergence-side lead section C2 serve as a through port and a cross port, respectively.

Basically, the 1-input/2-output device of FIG. 2 has the same configuration as the 2-input/2-output device of FIG. 1. In the device of FIG. 2, one straight optical waveguide E0 is optically connected to only the incidence end A1 of the one optical waveguide A in a direct manner, thus forming the incidence-side lead section C1. In FIGS. 1 and 2, like reference numerals are used to designate those elements which are common to the two devices. In the device of FIG. 2, the straight optical waveguide E0 is an incidence port, and the straight optical waveguides E3 and E4 connected to the emergence-side lead section C2 serve as a through port and a cross port, respectively.

In order to incorporate these devices in a fiber communication system, which is going to be practically used, it is necessary to prevent errors attributable to cross talk. Thus, the devices are expected to be subject to less cross talk, that is, to have high extinction ratio characteristics.

In the case of the device shown in FIG. 1, a theoretically perfect cross mode can be established by applying proper electrical signals from the electrodes F1, F2, F3 and F4.

In the case of a through mode, however, slight coupling is produced between the respective curved optical waveguides of each of the incidence- and emergence-side lead sections C1 and C2. In this case, therefore, a perfect through mode cannot be established, and the extinction ratio can be about 25 dB at the highest.

In the case of the device shown in FIG. 2, no coupling is produced corresponding to the one between the optical waveguides of the incidence-side lead section of the device shown in FIG. 1, so that the extinction ratio for the through mode can be about 35 dB, which is higher than that of the device shown in FIG. 1. However, the device of FIG. 2 cannot enjoy the symmetry between the coupling at the incidence-side lead section and that of the emergence-side lead section of the device of FIG. 1, and slight coupling is produced between the optical waveguides of the emergence-side lead section. According to the device of FIG. 2, therefore, the extinction ratio for the cross mode can be only about 20 dB at the highest.

Thus, the conventional devices, which have a low extinction ratio for the through or cross mode, cannot exhibit high extinction ratio characteristics for both the through and cross modes.

Since the extinction ratio characteristic of the optical device is defined by the lower one of the extinction ratios for the through and cross modes, only a low value can be obtained as the extinction ratio of the whole device.

The extinction ratio used here is a value given by $10 \log_{10}(|r|^2/|s|^2)$, where $|r|^2$ is the output power of the through port, and $|s|^2$ is the output power of the cross port.

Among optical devices constructed in this manner, known examples of those which have relatively high extinction ratio characteristics include an optical switch with an extinction ratio of about 27 dB reported in Technical Digest Integrated and Guide-wave Optics '86 by P. Granestrand et al. and a polarizing splitter with an extinction ratio of about 28 dB reported in the 1990 Autumn National Meeting C-216 of the Institute of Electronic Intelligence and Communication Engineers of Japan by H. M. Mak et al.

H. M. Mak et al. also proposed a device shown in FIG. 3 in the 1991 Spring National Meeting C-224 of the Institute of Electronic Intelligence and Communication Engineers of Japan.

Theoretically, this device can obtain an extinction ratio of at least 40 dB or thereabout.

The device shown in FIG. 3 can, however, enjoy this high theoretical extinction ratio only when the dimensional parameters of the individual partial junctions and the like are substantially equal to their theoretical values.

In actually manufacturing the device, however, these individual partial junctions and the like cannot always be formed with a dimensional accuracy based on the theoretical values obtained by calculation, and their dimensional parameters sometimes may delicately deviate from the theoretical values.

In such a case, the actual states of coupling between the optical waveguides at the individual partial junctions depart from theoretical states of coupling obtained by calculation, so that the extinction ratios for the cross and through modes inevitably lower.

OBJECT AND SUMMARY OF THE INVENTION

An object of the present invention is to provide a directional coupler type optical device, in which slight coupling between optical waveguides of an emergence-side lead section or slight coupling between the respective optical waveguides of each of incidence- and emergence-side lead sections is removed so that a high extinction ratio characteristic, preferably 30 dB or more, can be obtained in either of cross and through modes.

Another object of the present invention is to provide a directional coupler type optical device, in which asymmetry or difference between coupling of optical waveguides at incidence-side section and that of optical waveguides at emergence-side lead section, which lowers the extinction ratio for the cross mode, is removed, and a junction is formed in a manner such that the extinction ratio for the through mode has a maximum, whereby a high extinction ratio can be obtained in either of the cross and through modes.

Still another object of the present invention is to provide a directional coupler type optical device, in which a high extinction ratio characteristic can be obtained in either of the cross and through modes without any strict control of the dimensional parameters of various parts of the device during manufacture, so that the device can be manufactured with ease.

According to an aspect of the present invention, there is provided a directional coupler type optical device which comprises a junction including a pair of first optical waveguides arranged parallel to each other and propagation constant control means on the first optical waveguides for controlling the respective propagation constants of the first optical waveguides, an incidence-side lead section including a second optical waveguide optically connected to the incidence side of one of the two first optical waveguides, and an emergence-side lead section including a pair of third optical waveguides optically connected at each one end thereof to the emergence side of each corresponding first optical waveguide and optically connected at the respective other ends thereof to a through port and a cross port, individually, the optical device comprising coupling control means on the emergence-side lead section for controlling the coupling between the two third optical waveguides.

Preferably, the incidence-side lead section is formed of one straight optical waveguide for use as the second optical waveguide, so that the optical device functions as a 1-input/2-output directional coupler type optical device. Alternatively, the incidence-side lead section further includes another second optical waveguide optically connected to the incidence side of the other of the two first optical waveguides, so that the optical device functions as a 2-input/2-output directional coupler type optical device. The optical device further comprises second coupling control means on the incidence-side lead section for controlling the coupling between the two second optical waveguides. More preferably, in each of the 1-input/2-output or 2-input/2-output directional coupler type optical devices, the junction includes a first partial junction of a length $p1 \times L$, a second partial junction of a length $(1-p1-p2-p3) \times L/2$, a third partial junction of a length $p2 \times L$, a fourth partial junction of the same length as that of the second partial junction, and a fifth partial junction of a length $p3 \times L$, the L being the length of the junction, the p1, p2 and p3 being decimals or zero satisfying a relation $p1+p2+p3<1$ (p1, $p2\neq 0$ for 1-input/2-output; $p2\neq 0$ for 2-input/2-output), and the first to fifth partial junctions being optically connected in the order named, starting at the incidence end of the junction. The junction further includes third coupling control means on at least one of the first, third, and fifth partial junctions for controlling the coupling between corresponding portions of the two first optical waveguides.

According to another aspect of the present invention, there is provided a driving method for the aforesaid 1-input/2-output directional coupler type optical device, comprising the step of activating a required one of mode coupling suppressing means, included in the coupling control means and mounted individually on the two third optical waveguides, while applying a required electrical signal to the propagation constant control means, thereby establishing a high-extinction through or cross mode as required.

According to still another aspect of the present invention, there is provided a driving method for the aforesaid 2-input/2-output directional coupler type optical device, comprising the steps of activating second mode coupling suppressing means, included in the second coupling control means and mounted on that one of the two second optical waveguides upon which no light is incident, and activating a required one of the mode coupling suppressing means mounted individually on the two third optical waveguides, while applying a required electrical signal to the propagation constant control means, thereby establishing a high-extinction through or cross mode as required.

BRIEF DESCRIPTION OF THE DRAWINGS

FIG. 14 is a plane pattern diagram showing electrodes mounted in a different way;

FIG. 15 is a plane pattern diagram showing coupling control means mounted on the optical waveguide;

FIG. 16 is a plane pattern diagram showing coupling control means mounted in a different way;

DETAILED DESCRIPTION OF THE INVENTION

Referring now to FIGS. 4 to 8, a 1-input/2-output directional coupler type optical device according to a first embodiment of the present invention will be described.

As seen from FIG. 4, a basic plane pattern of this optical device is similar to that of the conventional 1-input/2-output directional coupler type optical device shown in FIG. 2 except that an emergence-side lead section C2 is constructed in a manner mentioned hereinbelow.

First, a pair of first optical waveguides A and B with the same width (path width W) are arranged parallel to each other with a fine space G between them at a junction C0, and a second optical waveguide formed of a straight optical waveguide E0 with the path width W is optically connected to an incidence end A1 of the one waveguide A, thus constituting an incidence-side lead section C1. Also, a pair of third optical waveguides formed individually of curved optical waveguides D3 and D4 with a curvature radius R and the path width W are optically connected to emergence ends A2 and B2 of the first waveguides A and B, respectively, thus constituting an emergence-side lead section C2. Moreover, straight optical waveguides E3 and E4 with the path width W are optically connected to the curved optical waveguides D3 and D4, respectively, so that the distance between the respective path-width centers of the waveguides E3 and E4 is GF, thus constituting a through port (E3) and a cross port (E4), respectively.

The emergence-side lead section C2 is not limited to the illustrated arrangement including the curved optical waveguides. Alternatively, for example, the regions from the emergence ends A2 and B2 to the straight optical waveguides E3 and E4 may be formed of finely tapered straight optical waveguides, individually.

Any of these optical waveguides is formed of a material which develops an electrooptical effect or a material of a structure such that its refractive index can be controlled by means of an electrical signal. In a natural state, the respective propagation constants of optical waveguides are equal. For example, each optical waveguide may be a multilayer laminate structure of a semiconductive material, such as GaAs/AlGaAs, formed by the MOCVD method.

At the junction C0, electrodes F1, F2, F3 and F4 are mounted on the optical waveguides A and B in an inverted $\Delta\beta$ configuration. These elements constitute propagation constant control means. Thus, the respective propagation constants of those optical waveguides which are situated right under these electrodes can be changed by introducing specific electric signals from the electrodes.

Figure 5:
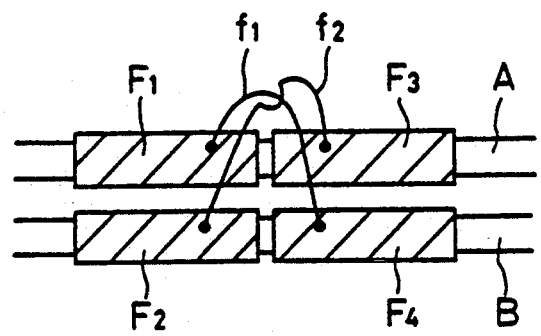
FIG. 5 is a plane pattern diagram showing an example of connection of electrodes in the optical device of FIG. 4.

If the optical waveguides A and B are formed of a semiconductive material, for example, it is necessary only that the electrodes F1 and F4 and the electrodes F2 and F3 be connected by means of leads f1 and f2, respectively, as shown in FIG. 5.

Referring again to FIG. 4, the optical device comprises mode coupling suppressing means (coupling control means, in a broader sense) which is formed by mounting electrodes F5 and F6 on the optical waveguides D3 and D4, respectively, of the emergence-side lead section C2.

When a specific forward electric current is injected from the electrode F5 or F6, for example, a plasma effect, band filling effect, etc. develop and lower the refractive index in the optical waveguide D3 or D4 right under the electrode. As a result, the coupling between the optical waveguides D3 and D4 becomes asymmetric, so that the mode coupling of light between the waveguides D3 and D4 is suppressed.

If the value of the injected forward current is changed, the state of suppression of the mode coupling also changes. If the injected forward current is increased by degrees, for example, a state can be obtained such that no optical waveguides equivalently exist, that is, the mode coupling is zero, when a certain current level is attained. This state is an extreme situation for mode coupling suppression, which will be referred to as the mode cutoff state, hereinafter.

Figure 4:
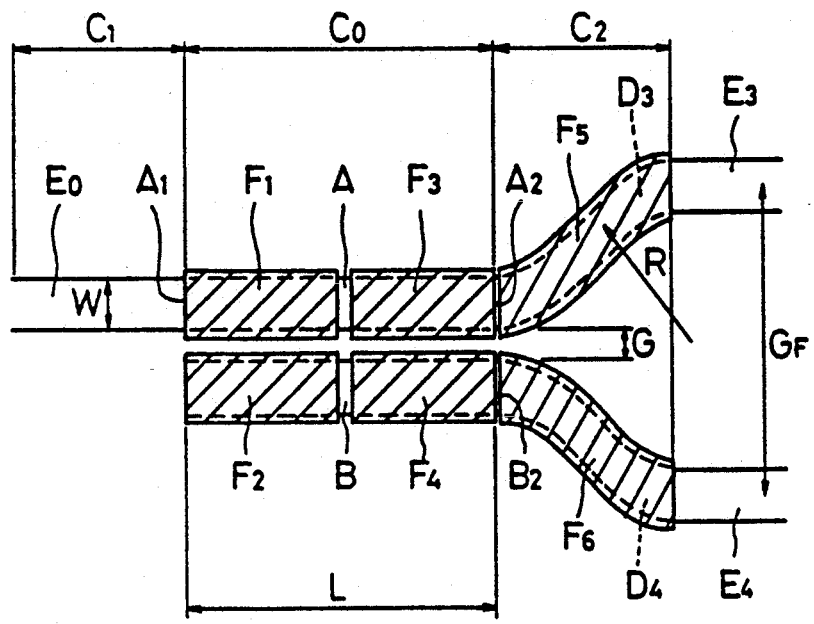
FIG. 4 is a plane pattern diagram showing the basic configuration of a 1-input/2-output directional coupler type optical device according to a first embodiment of the present invention.

In the optical device of FIG. 4, the incidence-side lead section C1 and the emergence-side lead section C2 are not symmetrical. If proper electrical signals are only applied to the electrodes (inverted $\Delta\beta$ configuration) F1 to F4 of the junction C0, therefore, a perfect through or cross mode cannot be obtained. Accordingly, in order to obtain a high-extinction switching state, it is necessary to remove slight coupling at the emergence-side lead section C2, and to make the coupling at the incidence-side lead section C1 conformable with the coupling at the emergence-side lead section C2 (even when no coupling exists at the section C1).

Thus, in the optical device of FIG. 4, the coupling at the emergence-side lead section C2 is removed by activating a corresponding one of the mode coupling suppressing means F5 and F6 depending on the switching state of the junction C0. For example, the mode coupling suppressing means F5, which is mounted on the optical waveguide D3 (connected to the through port E3) of the emergence-side lead section C2, is activated in the cross mode, while the mode coupling suppressing means F6, which is mounted on the optical waveguide D4 (connected to the cross port E4) of the section C2, is activated in the through mode.

Since the slight coupling at the emergence-side lead section C2, that is, the cause of deterioration of the extinction ratio, can be removed by activating the mode coupling suppressing means, high-extinction cross and through modes can be established by applying the electrical signals to the electrodes F1 to F4 of the junction C0.

Figure 6:
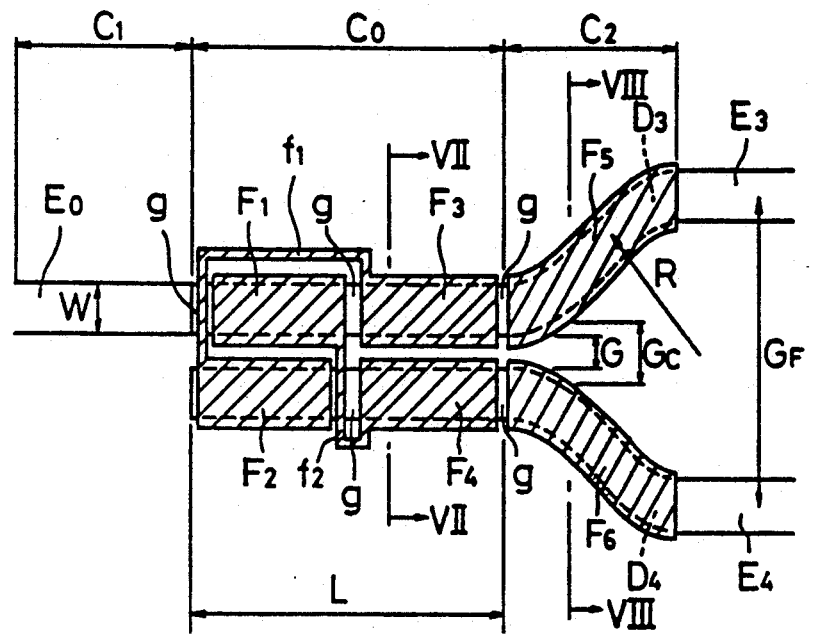
FIG. 6 is a detailed plane pattern diagram of the optical device of FIG. 4.
Figure 7:
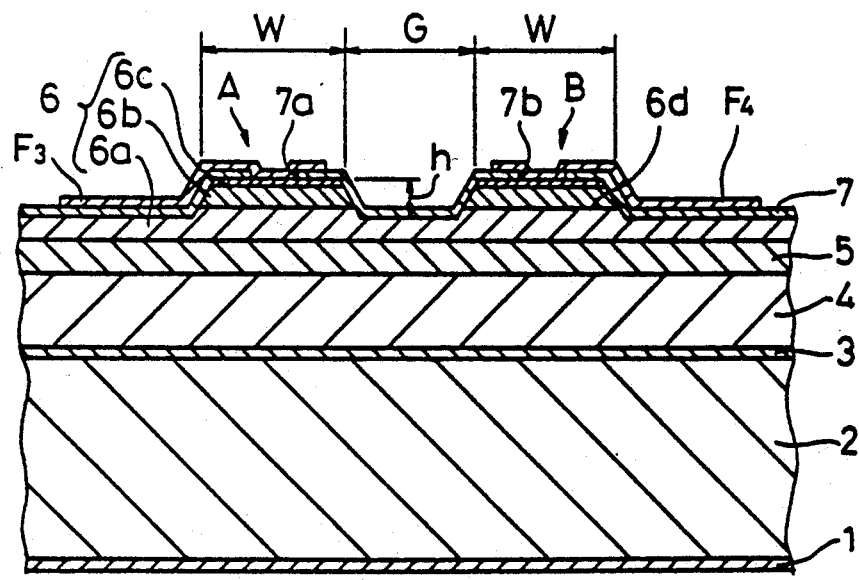
FIG. 7 is a sectional view taken along line VII—VII of FIG. 6.
Figure 8:
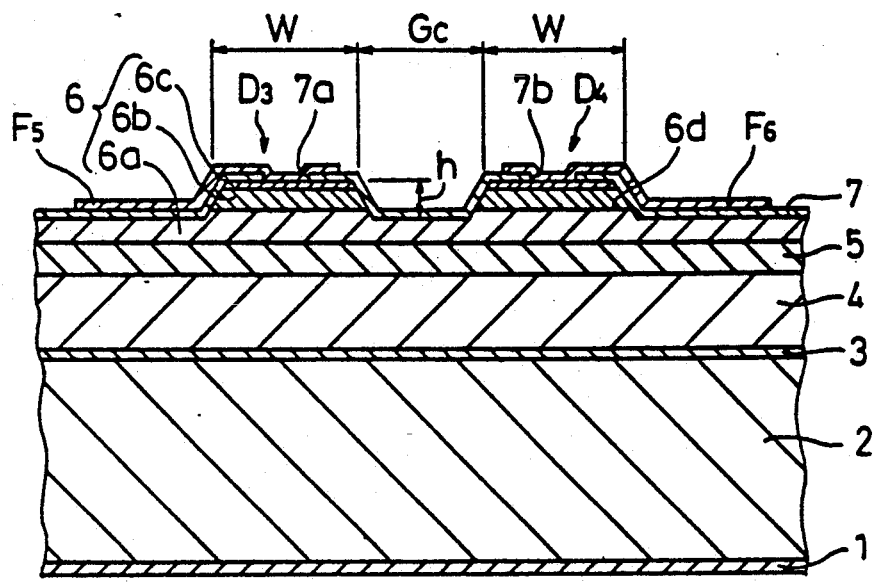
FIG. 8 is a sectional view taken along line VIII—VIII of FIG. 6.

Referring now to FIGS. 6 to 8, the optical device according to the present embodiment will be described further in detail.

In FIG. 6, the length of the junction C0 is 6.0 mm, the distance G between the optical waveguides A and B is 3.5 $\mu$m, the distance GF between the respective path-width centers of the through port E3 and the cross port E4 is 250 $\mu$m, the respective curvature radii R of the curved optical waveguides D3 and D4 are both 30 $\mu$m, and the path width W is 7 $\mu$m.

The junction C0 and the emergence-side lead section C2 are arranged in the manner shown in FIGS. 7 and 8, which are sectional views taken along lines VII—VII and VIII—VIII, respectively, of FIG. 6. Reference symbol Gc of FIGS. 6 and 8 indicate the distance between the optical waveguides D3 and D4 as viewed along line VIII—VIII of FIG. 6.

More specifically, a substrate 2 of n+GaAs, a buffer layer 3 of n+GaAlAs with a thickness of 0.5 $\mu$m, a lower cladding layer 4 of n+GaAlAs with a thickness of 3.0 $\mu$m, and a core layer 5 of n-GaAs with a thickness of 1.0 $\mu$m are stacked in layers on a lower electrode 1 of AuGeNi/Au, in the order named, by the MOCVD method. Further, a cladding 6a of n-GaAlAs, a cladding 6b of p-GaAlAs, and a cap 6c of p+GaAs are successively stacked in layers on the core layer 5 by the MOCVD method, thus constituting an upper cladding layer 6. The top of the cladding layer 6 is coated with an insulating film 7, such as an SiQ2 film. Thus, the two optical waveguides A and B with the path width W are formed into a ridge-shape with the distance G between them.

The height h of each optical waveguide is 1.0 $\mu$m, and the gap g between the electrodes is 3 $\mu$m.

At the regions where the electrodes F1, F2, F3 and F4 are to be mounted, as shown in FIG. 7, those parts of the insulating film 7 which cover the optical waveguides A and B are removed to form slit-shaped windows 7a and 7b. Ti/Pt/Au is, for example, deposited on the top face of the cap 6c through the windows 7a and 7b, thus forming the electrodes F3 and F4 (F1 and F2). The electrodes F3 and F2 and the electrodes F4 and F1 are connected by means of the leads f1 and f2, respectively, to provide the inverted $\Delta\beta$ configuration, thus forming the propagation constant control means.

At the emergence-side lead section C2, as shown in FIG. 8, those parts of the insulating film 7 which cover the optical waveguides D3 and D4 are removed to form the slit-shaped windows 7a and 7b. Ti/Pt/Au is deposited on the top face of the cap 6c through the windows 7a and 7b, thus forming the electrodes F5 and F6. These electrodes F5 and F6, which are independently connected to an electrical signal introduction system (not shown), constitute the mode coupling suppressing means for the optical waveguides D3 and D4, respectively.

In the optical waveguides A and B formed in this manner, the interface between the claddings 6a and 6b constitutes a pn-junction interface 6d. If specific electrical signals are introduced from the electrodes F1, F2, F3 and F4, therefore, an electrooptical effect, plasma effect, band filling effect, etc. develop at the pn-junction interface, so that the respective refractive indexes of those portions of the core layer 5 which are situated right under the electrodes change. As a result, a propagation constant difference $\Delta\beta$ is produced between the optical waveguides A and B, so that the state of optical coupling changes.

When a TE mode light beam with a wavelength of 1.3 $\mu$m is excited at the incidence port E0, and if only the electrooptical effect is developed by applying reverse bias voltage to the electrodes F1 to F4, in this device, switching characteristics of about 18 dB and 37 dB are obtained for the cross and through modes, respectively, according to theoretical calculations.

When the junction C0 was actually driven by means of the reverse bias voltage, however, the extinction ratio of about 17 dB was obtained with use of the driving voltage of −7 V for the cross mode, and about 26 dB was obtained with use of the driving voltage of −15 V for the through mode. Thus, the deterioration of the extinction ratio for the through mode proved substantial, in particular.

Thereupon, when a forward current of a suitable value was injected from the electrode F5 on the side of the optical waveguide D3 (connected to the through port E3) of the emergence-side lead section C2, in the cross mode with the driving voltage of −7 V, the extinction ratio characteristic improved to 30 dB or more. Thus, a cross mode with a very high extinction ratio was able to be established.

When a forward current of a suitable value was injected from the electrode F6 on the side of the optical waveguide D4 (connected to the cross port E4) of the emergence-side lead section C2, in the through mode with the driving voltage of −15 V, on the other hand, the extinction ratio characteristic improved to 30 dB or more. Thus, a through mode with a very high extinction ratio was able to be established.

The following is a description of a modification of the optical device according to the aforementioned embodiment.

The optical device according to this modification is constructed in the same manner as the optical device of the foregoing embodiment except that the curvature radius R of the curved optical waveguides D3 and D4 are 50 mm.

When a TE mode light beam with a wavelength of 1.3 $\mu$m is excited at the incidence port E0, and if only the electrooptical effect is developed by applying reverse bias voltage to the electrodes F1 to F4, in the device according to the modification, switching characteristics of about 18 dB and 33.8 dB are obtained for the cross and through modes, respectively, according to theoretical calculations, since the curvature radius of the optical waveguides D3 and D4 is greater than in the case of the foregoing embodiment.

When the junction C0 was actually driven by means of the reverse bias voltage, however, the extinction ratio of about 16.5 dB was obtained with use of the driving voltage of $-8$ V for the cross mode, and about 24 dB was obtained with use of the driving voltage of $-16$ V for the through mode. Thus, the extinction ratio worsened more than in the case of the foregoing embodiment.

Thereupon, when a forward current of a suitable value was injected from the electrode F5 on the side of the optical waveguide D3 (connected to the through port E3) of the emergence-side lead section C2, in the cross mode with the driving voltage of $-8$ V, the extinction ratio characteristic improved to 30 dB or more. Thus, a cross mode with a very high extinction ratio was able to be established.

When a forward current of a suitable value was injected from the electrode F6 on the side of the optical waveguide D4 (connected to the cross port E4) of the emergence-side lead section C2, in the through mode with the driving voltage of $-16$ V, on the other hand, the extinction ratio characteristic improved to 30 dB or more. Thus, a through mode with a very high extinction ratio was able to be established.

According to the embodiment and the modification thereof described above, the slight coupling at the emergence-side lead section can be removed by activating electrode F5 or F6 for use as the mode coupling suppressing means, so that a high extinction ratio characteristic of 30 dB or more can be obtained in either of the cross and through modes.

Even though the design parameters of the optical device vary, as seen from the comparison between the optical devices of the foregoing embodiment and its modification, a high extinction ratio of 30 dB or more can be obtained without depending on the variation. In other words, the optical device according to the embodiment can enjoy a high extinction ratio characteristic even though it is manufactured without any strict high-accuracy control of dimensional parameters, so that its manufacture is easy, and its industrial value is substantial.

Figure 9:
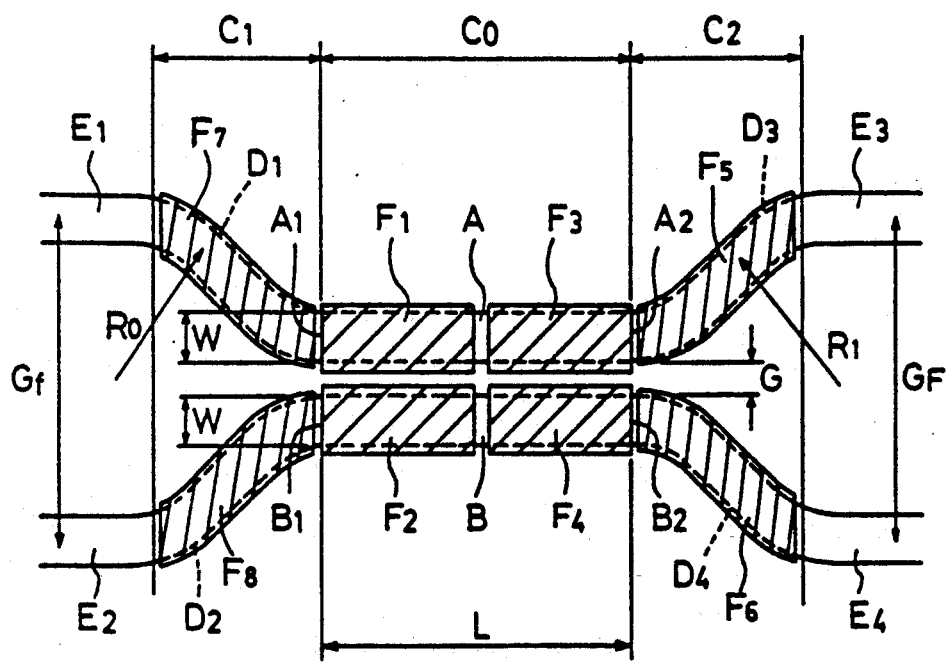
FIG. 9 is a plane pattern diagram showing the basic configuration of a 2-input/2-output directional coupler type optical device according to a second embodiment of the present invention.
Figure 10:
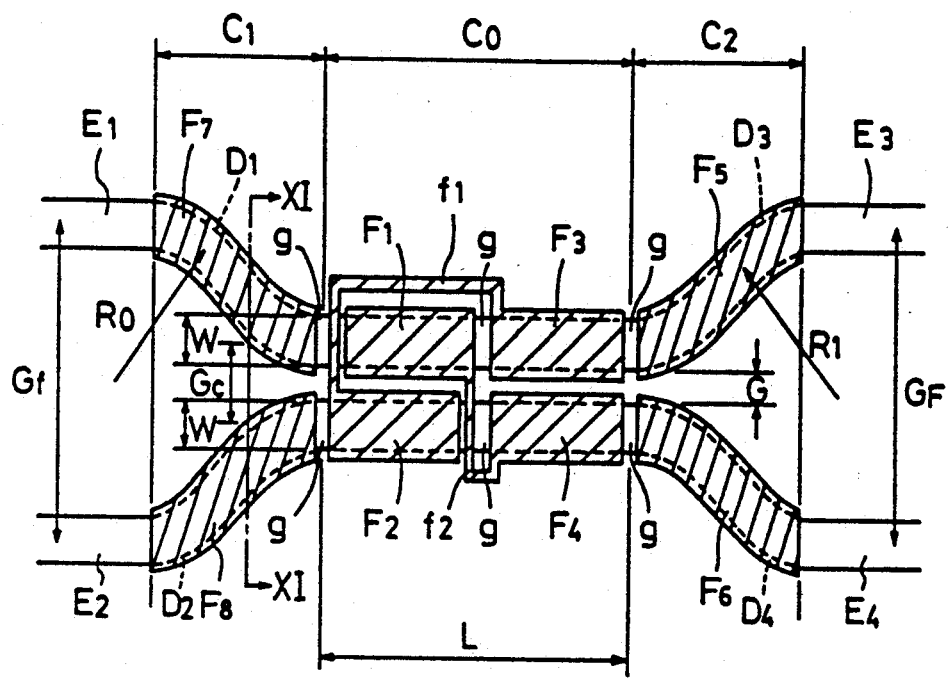
FIG. 10 is a plane pattern diagram showing the optical device of FIG. 9 in detail.
Figure 11:
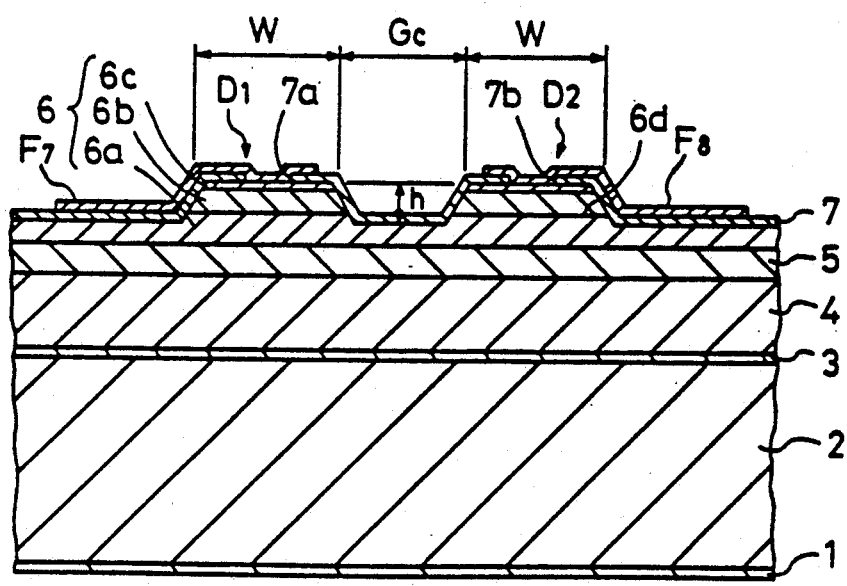
FIG. 11 is a sectional view taken along line XI—XI of FIG. 10.

Referring now to FIGS. 9 to 11, a 2-input/2-output directional coupler type optical device according to a second embodiment of the present invention will be described.

Figure 3:
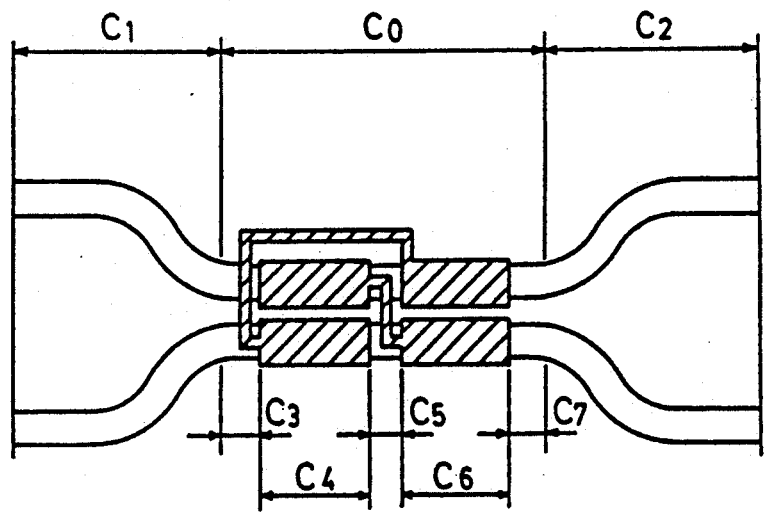
FIG. 3 is a plane pattern diagram of an optical device reported in the 1991 Spring National Meeting C-224 of the Institute of Electronic Intelligence and Communication Engineers of Japan.

As seen from FIG. 9, a plane pattern of the optical device of the present embodiment differs from that of the conventional 2-input/2-output directional coupler type optical device shown in FIG. 3 only in that incidence- and emergence-side lead sections C1 and C2 are constructed as follows. Except for the configuration of the incidence-side lead section C1, moreover, the optical device of the present embodiment is identical with that of the first embodiment. Therefore, like reference numerals are used to designate like or common elements used in the conventional devices and those of the first and second embodiments, and a description of those elements is omitted.

The optical device of the present embodiment comprises a junction C0 and an emergence-side lead section C2 which are constructed in the same manner as those of the first embodiment. Curved optical waveguides D1 and D2 with the path width W and curvature radii R0 and R1, respectively, are optically connected to incidence ends A1 and B1 of two optical waveguides A and B of the junction C0, respectively, thus constituting an incidence-side lead section C1. Straight optical waveguides E1 and E2 are optically connected to these waveguides D1 and D2, respectively, so that the distance between the respective path-width centers of the waveguides E1 and E2 is Gf, thus constituting incidence ports.

The incidence-side lead section C1 is not limited to the illustrated arrangement including the curved optical waveguides. Alternatively, for example, the regions from the incidence ends A1 and B1 to the straight optical waveguides E1 and E2 may be formed of finely tapered straight optical waveguides, individually.

Further, the optical device comprises second mode coupling suppressing means (second coupling control means, in a broader sense) which, like the mode coupling control means F5 and F6 described before with reference to FIG. 4, is formed by mounting electrodes F7 and F8 on the optical waveguides D1 and D2, respectively, of the incidence-side lead section C1.

When a specific forward current is injected from the electrode F7 or F8, for example, a plasma effect, band filling effect, etc. develop and lower the refractive index in the optical waveguide D1 or D2 right under the electrode. As a result, the coupling between the optical waveguides D1 and D2 becomes asymmetric, so that the mode coupling of light between the waveguides D1 and D2 is suppressed. As in the case of the foregoing optical waveguides D3 and D4, the mode cutoff state can be established between the waveguides by increasing the injected forward current by degrees.

In the optical device of FIG. 9, the incidence-side lead section C1 and the emergence-side lead section C2 are symmetrical. Theoretically, therefore, a perfect cross mode can be obtained by driving the electrodes F1 to F4 of the junction C0 by means of proper electrical signals. Since slight coupling is formed at the incidence- and emergence-side lead sections C1 and C2, the extinction ratio characteristic for the through mode is deteriorated. In order to obtain a high extinction ratio in the through mode, therefore, the coupling must be removed.

Thus, in the case of the optical device of FIG. 9, the coupling at the incidence-side lead section C1 is removed by activating the mode coupling suppressing means (electrode F8 in FIG. 9) on that optical waveguide (waveguide D2, for example) upon which no light is incident, out of the optical waveguides D1 and D2 of the incidence-side lead section C1, in the aforesaid state, while the coupling at the emergence-side lead section C2 is removed by activating the mode coupling suppressing means (electrode F6) on the optical waveguide D4 which is connected to a cross port (waveguide E4 in FIG. 9) of the emergence-side lead section C2. By doing this, the slight coupling at the incidence- and emergence-side lead sections C1 and C2 can be thoroughly removed, so that a high-extinction through mode can be established by driving the electrodes at the junction C0.

If the incidence- and emergence-side lead sections C1 and C2 are arranged asymmetrically for some reason or other, a high-extinction cross mode can be established in the following manner, as in the case of the through mode. The coupling at the incidence-side lead section C1 is first removed by activating the mode coupling suppressing means (electrode F8 in FIG. 9) on that optical waveguide (waveguide D2, for example) upon which no light is incident, out of the optical waveguides D1 and D2 of the incidence-side lead section C1, and the coupling at the emergence-side lead section C2 is then removed by activating the mode coupling suppressing means (electrode F5) on the optical waveguide D3 which is connected to a through port (waveguide E3 in FIG. 9) of the emergence-side lead section C2. By doing this, the slight coupling at the incidence- and emergence-side lead sections C1 and C2 can be thoroughly removed, so that a high-extinction cross mode can be established by driving the electrodes at the junction C0.

The slight coupling at the incidence- and emergence-side lead sections C1 and C2 can be thoroughly removed to further improve the extinction ratio characteristics by activating the aforesaid mode coupling suppressing means in a manner such that the mode coupling is zero, that is, the mode cutoff state is established.

Referring now to FIGS. 10 and 11, the optical device according to the present embodiment will be described further in detail.

In FIG. 10, the length of the junction C0 is 6.0 mm, the distance G between the optical waveguides A and B is 3.5 $\mu$m, the distance Gf between the respective path-width centers of the incidence ports E1 and E2 and the distance GF between the respective path-width centers of the through port E3 and the cross port E4 are both 250 $\mu$m, the respective curvature radii R0 and R1 of the curved optical waveguides D1 and D2 and the waveguides D3 and D4, which constitute the incidence- and emergence-side lead sections C1 and C2, respectively, are both 50 $\mu$m, and the path width W is 7 $\mu$m. The gap g between the electrodes is 3.0 $\mu$m.

The junction C0 and the emergence-side lead section C2 are constructed or formed in the same manner as those of the first embodiment shown in FIGS. 7 and 8, so that a description of those elements is omitted. As shown in FIG. 11, which is a sectional view taken along line XI—XI of FIG. 10, the incidence-side lead section C1 has the same configuration as the emergence-side lead section C2, so that a description of its construction and the forming method therefor is omitted. Further, the electrodes F7 and F8 of the incidence-side lead section C1, which function as the mode coupling suppressing means for the optical waveguides D1 and D2, respectively, are formed in the same manner as the electrodes F5 and F6 of the emergence-side lead section C2 described before with reference to FIG. 8. Also, the electrodes F7 and F8 are connected to an electrical signal introduction system (not shown), independently of each other and of the electrodes F5 and F6.

When a TE mode light beam with a wavelength of 1.3 $\mu$m is excited at the incidence port E1 or E2, and if only the electrooptical effect is developed by applying reverse bias voltage to the electrodes F1 to F4, in this device, switching characteristics of 60 dB or more and 30 dB or more are obtained for the cross and through modes, respectively, according to theoretical calculations.

When the junction C0 was actually driven by means of the reverse bias voltage, however, the extinction ratio of 30 dB or more was obtained with use of the driving voltage of $-7$ V for the cross mode, while about 20 dB was obtained with use of the driving voltage of $-15$ V for the through mode. Thus, the deterioration of the extinction ratio for the through mode proved substantial, in particular.

Thereupon, light was applied to the incidence-side port E1, and a forward current of a suitable value was injected from the electrodes F8 and F5 in the cross mode with the driving voltage of $-7$ V, so that the optical waveguides D2 and D3 were brought to the mode cutoff state. As a result, the optical device was driven in the cross mode with the extinction ratio of 30 dB or more.

Further, light was applied to the incidence-side port E1, and a forward current of a suitable value was injected from the electrodes F8 and F6 in the through mode with the driving voltage of $-15$ V, so that the optical waveguides D2 and D4 were brought to the mode cutoff state. As a result, the optical device was driven in the through mode with the extinction ratio of 30 dB or more.

According to the optical device of the second embodiment, as described above, the slight coupling at the incidence- and emergence-side lead sections can be removed by activating required ones of the electrodes F5 to F8, for use as the mode coupling suppressing means, while driving the electrodes F1 to F4 of the junction C0, for use as the propagation constant control means, to keep the device in the cross or through mode. Thus, a high extinction ratio characteristic of 30 dB or more can be obtained in either of the cross and through modes. The mechanism of providing the high extinction ratio does not depend on the design parameters of the optical device, so that the manufacture of the device is easy with respect to the dimensional accuracy.

Referring now to FIGS. 12 to 16, a 1-input/2-output directional coupler type optical device according to a third embodiment of the present invention will be described.

Figure 1:
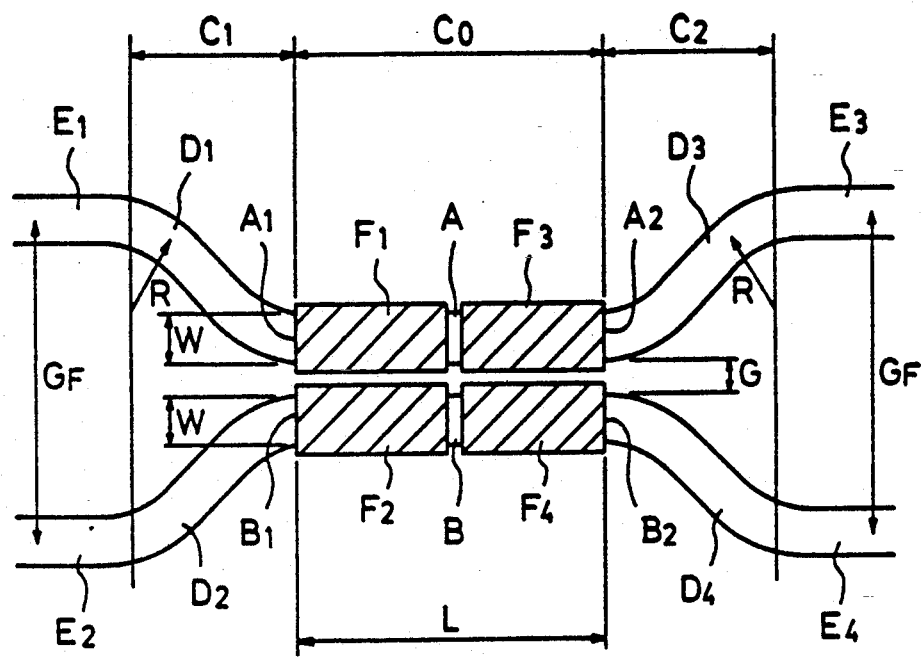
FIG. 1 is a plane pattern diagram of a conventional 2-input/2-output directional coupler type optical device.
Figure 2:
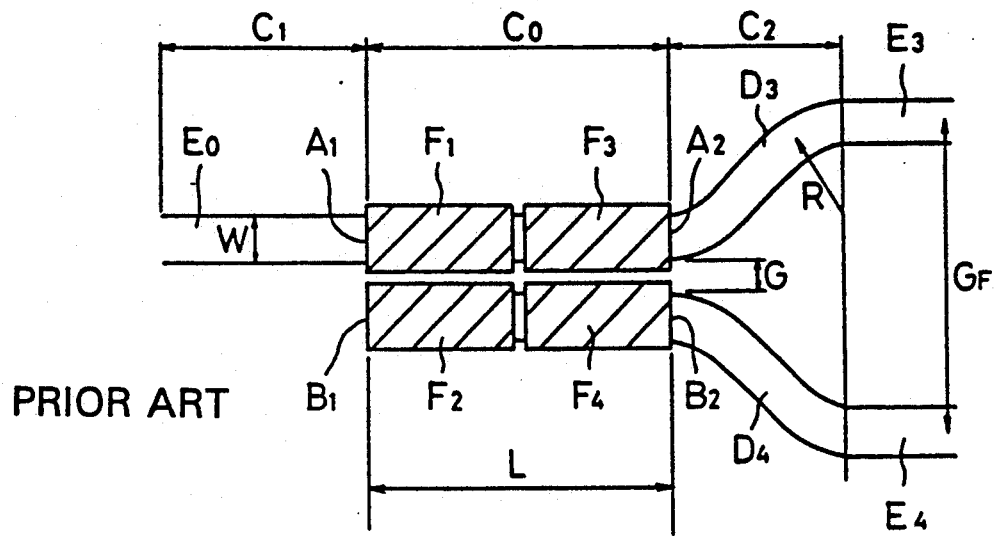
FIG. 2 is a plane pattern diagram of a conventional 1-input/2-output directional coupler type optical device.
Figure 12:
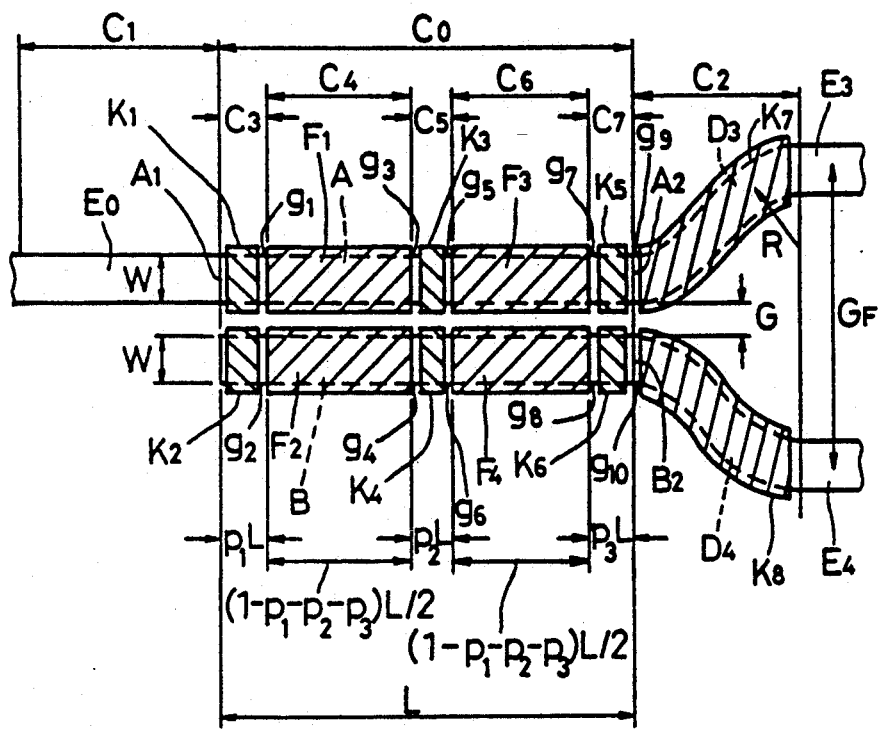
FIG. 12 is a plane pattern diagram showing the basic configuration of a 1-input/2-output directional coupler type optical device according to a third embodiment of the present invention.

As seen from FIG. 12, a plane pattern of the optical device of the present embodiment differs from that of the conventional one shown in FIG. 2 only in the construction of the junction C0 and emergence-side lead section C2. Except for the junction C0, moreover, the optical device of the present embodiment is similar to the optical device of the first embodiment shown in FIG. 4. Therefore, like reference numerals are used to designate like or common elements used in the conventional devices and those of the first and third embodiments, and a description of those elements is omitted.

The optical device of the present embodiment comprises an incidence-side lead section C1 and an emergence-side lead section C2 which are constructed in the same or similar manner as those of the first embodiment. A junction C0 is formed by optically connecting a front partial junction C3, front partial junction C4 with electrode, central partial junction C5, rear partial junction C6 with electrode, and rear partial junction C7 in the order named, ranging from an incidence end A1 to emergence ends A2 and B2 thereof. The front partial junction C3 serves as a first partial junction at which control means K1 and K2 for the coupling coefficient or state of coupling between optical waveguides A and B are mounted. The front partial junction C4 with electrode serves as a second partial junction at which front electrodes F1 and F2 are mounted on the optical waveguides A and B, respectively. The central partial junction C5 serves as a third partial junction at which control means K3 and K4 for the coupling coefficient or state of coupling between the optical waveguides A and B are mounted. The rear partial junction C6 with electrode serves as a fourth partial junction at which rear electrodes F3 and F4 are mounted on the optical waveguides A and B, respectively. The rear partial junction C7 serves as a fifth partial junction at which control means K5 and K6 for the coupling coefficient or state of coupling between the optical waveguides A and B are mounted.

If the overall length of the junction C0 is L, and if p1, p2 and p3 are decimals or zero satisfying a relation p1+p2+p3<1 (p1, p2≠0), the length of the front partial junction C3 is p1×L, that of the front partial junction C4 with electrode is (1−p1−p2−p3)×L/2, that of the central partial junction C5 is p2×L, that of the rear partial junction C6 with electrode is (1−p1−p2−p3)×L/2, and that of the rear partial junction C7 is p3×L.

Further, control means K7 and K8 for the coupling coefficient or state of coupling between curved optical waveguides D3 and D4 of the emergence-side lead section C2 are mounted on the waveguides D3 and D4, respectively. The control means K7 and K8 correspond to the electrodes F5 and F6 of FIG. 4, respectively.

At the partial junctions C4 and C6, the electrodes F1, F2, F3 and F4, which, like those of the first and second embodiments, serve to control the respective propagation constants of the optical waveguides A and B, respectively, are mounted to form an inverted $\Delta\beta$ structure.

If the optical waveguides are formed of a semiconductive material, for example, it is necessary only that the electrodes F1 and F4 and the electrodes F2 and F3 be connected by means of leads f1 and f2, respectively, as mentioned before with reference to FIG. 5.

Figure 13:
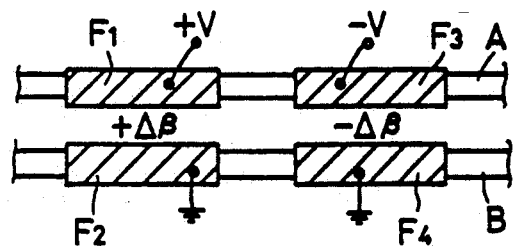
FIG. 13 is a plane pattern diagram showing electrodes mounted on optical waveguides.

If the optical waveguides are formed of a dielectric, such as LiNbO3, it is necessary only that the electrodes be connected to one another, as shown in the plane pattern diagrams of FIGS. 13 and 14. FIG. 13 shows a case in which the crystal of LiNbO3 is cut in the Z-direction. The electrodes F1 to F4 must only be mounted on the optical waveguides A and B so that voltage can be applied in the manner shown in FIG. 13. If the crystal of LiNbO3 is cut in the Y-direction, it is necessary only that a grounded common electrode be located between the waveguides A and B so that voltage can be applied on either side of each waveguide, as shown in FIG. 14.

The control means K1 and K8 can be formed by mounting electrodes on the optical waveguides at the partial junctions C3, C5, C7 and C2 or by arranging the electrodes in the vicinity of the waveguides so that electrical signals are introduced from these electrodes.

If the optical waveguides A and B are formed of a semiconductive material, for example, it is necessary only that the electrodes be mounted individually in the respective positions of the partial junctions C3, C5, C7 and C2 and connected to one another. By introducing proper electrical signals from the control means K1 to K8 into the optical waveguides right under them, the respective refractive indexes of the two optical waveguides A and B can be increased or decreased to the same degree. Thus, the coupling coefficient k between the two optical waveguides can be directly changed without entailing the propagation constant difference $\Delta\beta$. Even in case the coupling control means (electrodes) are not connected to one another, moreover, the same effect as aforesaid can be obtained if the electrical signals introduced into the individual control means are identical.

If the optical waveguides A and B are formed of a dielectric, such as LiNbO3 whose crystal is cut in the Z-direction, it is necessary only that the coupling control means K be mounted as shown in FIGS. 15 and 16. For example, the coupling coefficient between the optical waveguides A and B can be reduced by mounting the control means (electrodes) K individually on the optical waveguides A and B at the partial junctions C3, C5, C7 and C2, as shown in FIG. 15, so that voltage can be applied as illustrated. Further, the coupling coefficient between the optical waveguides A and B can be increased by locating a grounded common electrode between the waveguides A and B, and by arranging the electrodes in the manner shown in FIG. 16 so that voltage can be applied as illustrated on either side of each waveguide.

The coefficients p1 and p3, among the coefficients p1, p2 and p3 for defining the respective lengths of the individual partial junctions, are selected as values such that the state of coupling at the front partial junction C3 with the length p1×L agrees with the state of coupling at the region including the rear partial junction C7 with the length p1×L and the emergence-side lead section C2 so that the connection at the front partial junction C3 and the connection at an equivalent emergence-side lead section formed of the rear partial junction C7 and the emergence-side lead section C2 cancel each other, whereby the whole device can equivalently enjoy perfectly symmetrical incidence- and emergence-side lead sections.

The coefficient p2 is adjusted to a value such that the central partial junction C5 has a length corresponding to a maximum value of the extinction ratio as measured in the through mode with the length of the junction C5 varied. Thus, a state of coupling can be obtained which is equivalent to the sum of the individual states of coupling at the front and rear partial junctions C3 and C7 and the emergence-side lead section C2.

Preferably, gaps g1 to g10 with a suitable width are formed between the electrodes and the control means mounted on the individual partial junctions. These gaps serve to prevent the electrodes F1 to F4 and the control means K1 and K8 at the adjacent partial junctions from being influenced by the electrical signals introduced into the electrodes F1 to F4 and the control means K1 to K8.

In the case of the directional coupler type optical device according to the present embodiment, the state of coupling at the front partial junction C3 agrees with the state of coupling at the region including the rear partial junction C7 and the emergence-side lead section C2. In the directional coupler as a whole, therefore, the front partial junction C4 with electrode, central partial junction C5, and rear partial junction C6 with electrode develop a state equivalent to the one obtained in the case where the incidence- and emergence-side lead sections are perfectly symmetrical. Thus, the extinction ratio for the cross mode can be prevented from lowering.

The central partial junction C5 is adjusted to a length such that the extinction ratio for the through mode has a maximum. In this case, the theoretical extinction ratio for the through mode is 60 dB or more.

By activating the control means K7 and K8 mounted on the emergence-side lead section C2, moreover, the deviation between the actual and theoretical states of coupling at each partial junction, attributable to variation in dimensional accuracy in the manufacture of the device, can be adjusted to restore the device to a high-extinction state.

Figure 17:
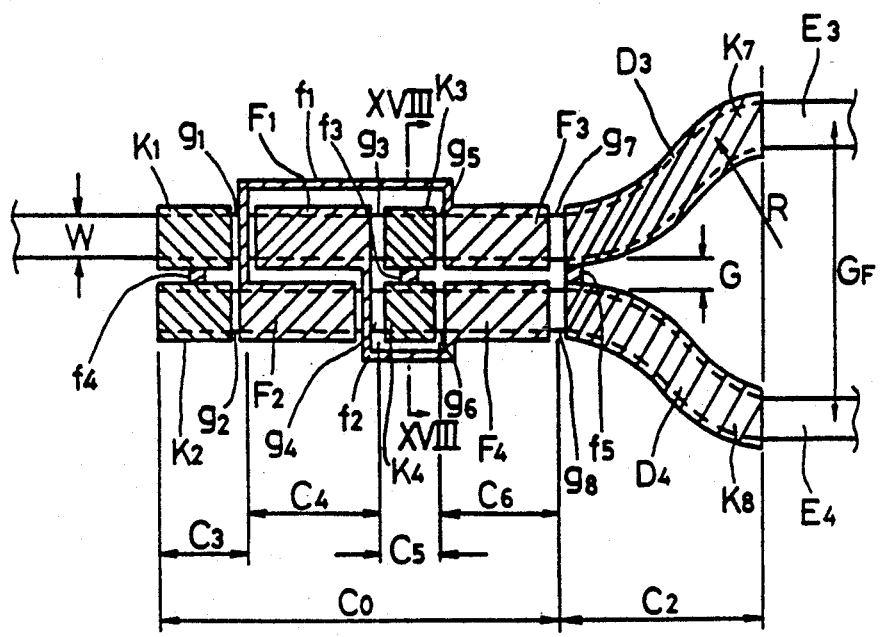
FIG. 17 is a plane pattern diagram showing a modification of the optical device according to the third embodiment.
Figure 18:
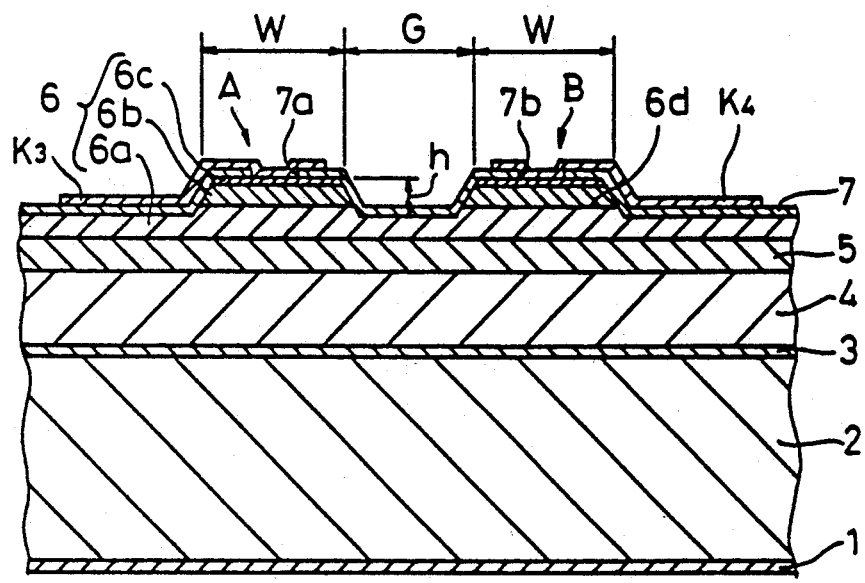
FIG. 18 is a sectional view taken along line XVIII—XVIII of FIG. 17.

Referring now to FIGS. 17 and 18, a modification of the optical device according to the third embodiment will be described.

The optical device according to this modification is a modified version of the device shown in FIG. 12 in which p3=0 is given, that is, the respective emergence ends A2 and B2 of the optical waveguides A and B are optically connected directly to their corresponding curved optical waveguides D3 and D4 without the use of the rear partial junction C7.

In FIG. 17, the length of the junction C0 is 8.0 mm, the distance G between the optical waveguides A and B is 3.5 μm, the distance GF between the respective path-width centers of the through port E3 and the cross port E4 is 250 μm, the respective curvature radii R of the curved optical waveguides D3 and D4, which constitute the emergence-side lead section C2, are both 30 μm, and the path width W is 7 μm.

The length, p1×L, of the front partial junction C3 is 268.5 μm (p1=0.0335626), the length, p2×L, of the central partial junction C5 is 537 μm (p2=0.067125), and the respective lengths of the front partial junction C4 with electrode and the rear partial junction C6 with electrode are both 3.59725 mm.

The front and rear partial junctions C4 and C6 with electrode at the junction C0 and the emergence-side lead section C2 are constructed or formed in the same manner as those of the first embodiment shown in FIGS. 7 and 8. Further, the central partial junction C5 is constructed in the manner shown in FIG. 18, which is a sectional view taken along line XVIII—XVIII of FIG. 17.

More specifically, as in the case of the first embodiment, a substrate 2, a buffer layer 3, a lower cladding layer 4, and a core layer 5 are stacked in layers on a lower electrode 1 in the order named. Further, claddings 6a and 6b and a cap 6c are successively stacked in layers on the core layer 5, thus constituting an upper cladding layer 6. The top of the cladding layer 6 is coated with an insulating film 7, whereby the optical waveguides A and B are formed. The waveguides A and B, each in the form of a ridge having a predetermined depth h and path width W, are formed by stacking the aforesaid layers for lamination and subjecting the resulting laminate to conventional photolithography and etching. The respective thicknesses of the individual layers, which are the same as those of their corresponding layers of the first embodiment, are optimum values for the case where the depth h of the optical waveguides A and B is 1.0 μm. Furthermore, corresponding ones of the electrodes F1, F2, F3 and F4, formed in the same manner as those of the first embodiment, are connected to one another by means of the lead f1 or f2, thus constituting the inverted Δβ structure.

At those portions where the control means K1, K2, K3, K4, K7 and K8 are to be mounted, Ti/Pt/Au is deposited on windows 7a and 7b to form the control means K3 and K4 (K1, K2, K7 and K8), as shown in FIG. 18. The control means K3 and K4, K1 and K2, and K7 and K8 are connected by means of leads f4, f3 and f5, respectively (FIG. 17). In the optical waveguides A and B formed in this manner, the interface between the claddings 6a and 6b constitutes a pn-junction interface 6d. If specific electrical signals are introduced from the electrodes F1 to F4 and the control means K1 and K8, therefore, an electrooptical effect, plasma effect, band filling effect, etc. develop at the pn-junction interface, so that the respective refractive indexes of those portions of the core layer 5 which are situated right under the electrodes change. As a result, the state of optical coupling between the optical waveguides A and B changes.

The gaps g1 to g8 between the individual partial junctions are all 3.0 μm.

Figure 19:
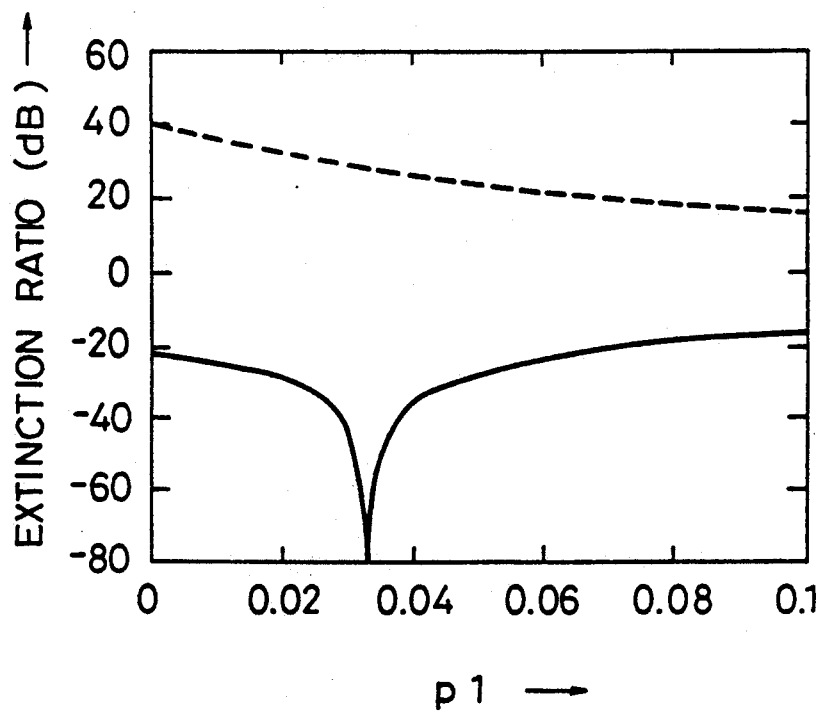
FIG. 19 is a graph showing the relationships between a coefficient p1 and extinction ratio obtained with use of $p2=p3=0$, in the optical device shown in FIG. 17.

FIG. 19 shows theoretical characteristic curves individually representing changes of the extinction ratios for the through and cross ports E3 and E4 obtained when p1 is varied use of p2=p3=0, in this device. In FIG. 19, broken line represents the change of the extinction ratio for the through port, and full line for the cross port. As seen from these curves, the extinction ratio for the cross port is 60 dB or more when p1 ranges from 0.322 to 0.0338, and has a maximum when the front partial junction C3 is formed with the value p1 in the vicinity of 0.0335625.

Figure 20:
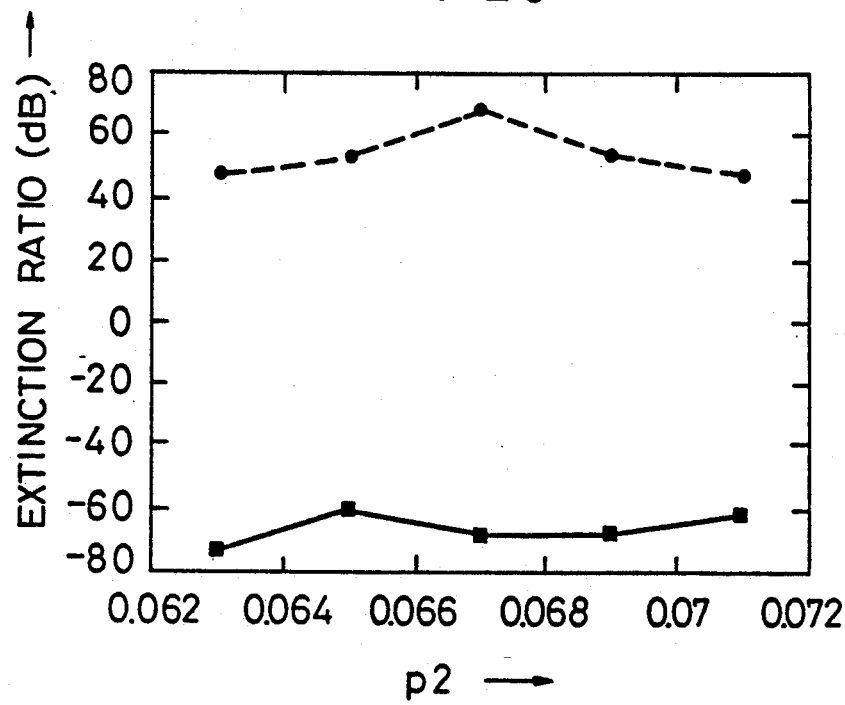
FIG. 20 is a graph showing the relationships between a coefficient p2 and extinction ratio obtained with use of $p1=0.0335625$, in the device shown in FIG. 17.

FIG. 20 shows theoretical characteristic curves individually representing changes of the extinction ratios for the through and cross ports E3 and E4 obtained when the coefficient p2 is varied with use of p1=0.0335625 and p3=0. In FIG. 20, broken line represents the change of the extinction ratio for the through port, and full line for the cross port.

As seen from the theoretical characteristic curves of FIGS. 19 and 20, this device theoretically can obtain the extinction ratio of 60 dB or more for either of the through and cross modes.

If the depth h of the optical waveguides A and B shown in FIG. 18 varies, the extinction ratios of the device become lower than the theoretical values shown in FIGS. 19 and 20 even though the other dimensional parameters are fixed.

If the value of the depth h is 0.05 μm smaller than the preset value 1.0 μm, for example, extinction ratios of only about 30 dB and 25 dB can be obtained for the cross and through modes, respectively, even though optimum electrical signals are introduced into the electrodes F1 to F4 of the device. In other words, if the optical device shown in FIG. 18 is manufactured with use of the same dimensional parameters for the case of the first embodiment, and if its extinction ratios for the cross and through modes are about 30 dB and 25 dB, respectively, then the depth h of the optical waveguides A and B of this device will be 0.95 μm, not 1.0 μm.

Figure 21:
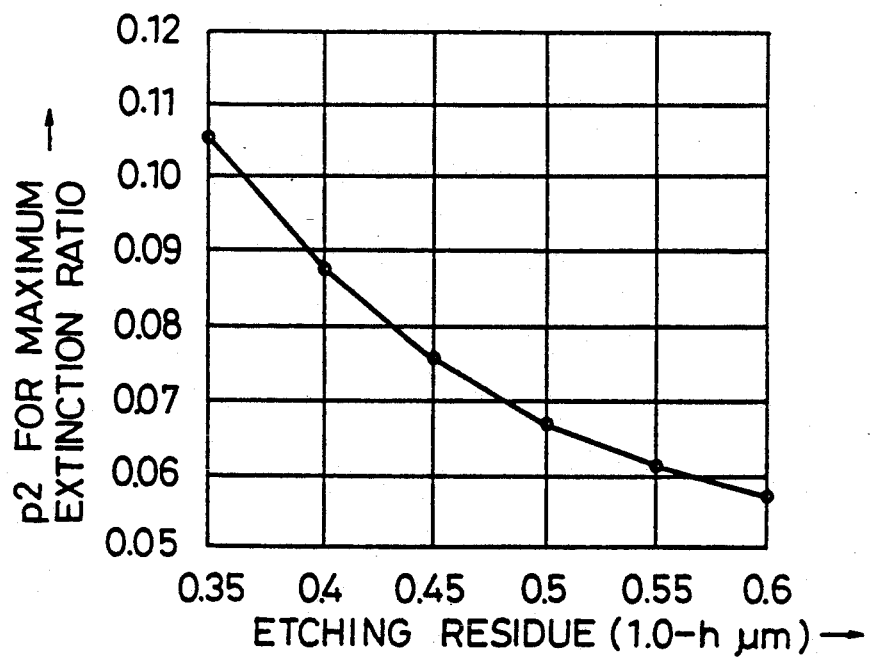
FIG. 21 is a graph showing a change of the coefficient p2 compared with the etching depth h of the optical waveguide.

FIG. 21 shows the result of measurement on the relationship between the etching residue, 1.0−h (μm), and the coefficient p2 for the maximum extinction ratio, obtained as the depth h of the device is varied. In this case, p2 is given by p2=p½.

Where the depth h of the device ranges from 1.0 μm to 0.95 μm, as seen from FIG. 21, the value p2 varies from 0.067125 to 0.061239. Thus, the extinction ratios of the device can be believed to be lower than the theoretical values.

A reverse voltage of about −16 V was applied to the control means (electrodes) K1 and K2 of the front partial junction C3, the control means (electrodes) K3 and K4 of the central partial junction C5, and the control means (electrodes) K7 and K8 of the emergence-side lead section C2, and at the same time, a reverse voltage of −7 V was applied to the electrodes F1 to F4. Thereupon, a cross mode with the extinction ratio of 30 dB or more was obtained. When a reverse voltage of −15 V was applied to the electrodes F1 to F4, on the other hand, a through mode with the extinction ratio of 30 dB or more was obtained.

This is attributable to the following result. The electrooptical effect of the optical waveguides was developed by the applied reverse voltage, at the partial junctions C3 and C5 and the emergence-side lead section C2, so that the respective refractive indexes of those sections were increased. Accordingly, light was confined so tight that the coupling coefficient between the paired optical waveguides was lowered. Thus, the length of the partial junction C5 increased from 490 μm (corresponding to p2 to 0.061239) and equivalently approached a preset value 540 μm (corresponding to p2 of 0.067125).

If the etching depth h is increased, it is necessary only that current be injected from the individual control means to reduce the respective refractive indexes of the optical waveguides right under the control means by utilizing the plasma effect of the waveguides, so that the coupling coefficient between the waveguides is correspondingly increased to shorten the length of the partial junction C5 equivalently.

In the optical devices according to the third embodiment and its modification, as seen from the above description, the asymmetry of coupling between the incidence- and emergence-side lead sections of the conventional directional couplers can be removed by properly designing the front and rear partial junctions and the state of coupling at the emergence-side lead section, so that the extinction ratio for the cross mode can be prevented from lowering. Also, the extinction ratio can be prevented from undergoing deterioration attributable to the variation in accuracy of the dimensional parameters during the manufacture of the optical devices. Since the central partial junction is formed having a length such that the extinction ratio for the through mode has its maximum, moreover, the through-mode extinction ratio can be also kept high. In other words, the optical devices of the third embodiment and its modification exhibit a high extinction ratio for either of the through and cross modes.

Figure 22:
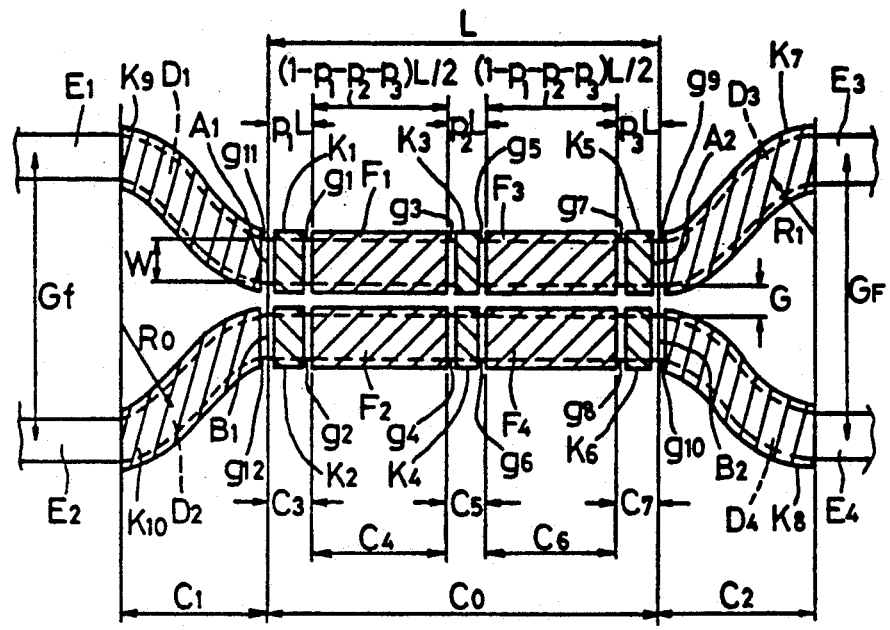
FIG. 22 is a plane pattern diagram showing the basic configuration of a 2-input/2-output directional coupler type optical device according to a fourth embodiment of the present invention.

Referring now to FIG. 22, a 2-input/2-output directional coupler type optical device according to a fourth embodiment of the present invention will be described.

As seen from FIG. 22, a plane pattern of the optical device of the present embodiment corresponds to a combination of the respective devices of the second and third embodiments. In the present embodiment, a junction C0 is identical with that of the third embodiment, and incidence- and emergence-side lead sections C1 and C2 are identical with or similar to those of the second embodiment. Therefore, like reference numerals are used to designate like or common elements used in the second or third embodiment and the present embodiment, and a description of those elements is partially omitted.

In brief, curved optical waveguides D1 and D2 are optically connected to incidence ends A1 and B1 of optical waveguides A and B of the junction C0, respectively, thus constituting an incidence-side lead section C1, and curved optical waveguides D3 and D4 are optically connected to emergence ends A2 and B2 of the waveguides A and B, respectively, thus constituting an emergence-side lead section C2. Also, straight optical waveguides E1 and E2 are optically connected to the waveguides D1 and D2, respectively, and straight optical waveguides E3 and E4 to the waveguides D3 and D4, respectively.

At the incidence- and emergence-side lead sections C1 and C2 which resemble those of the second embodiment (FIG. 9), control means K9 and K10 (corresponding to the electrodes F7 and F8, respectively, for use as the second mode coupling suppressing means of the second embodiment) for the coupling coefficient or state of coupling between the optical waveguides D1 and D2 are mounted on the waveguides D1 and D2, respectively, and control means K7 and K8 (corresponding to the electrodes F5 and F6, respectively, of the second embodiment) for the coupling coefficient or state of coupling between the optical waveguides D3 and D4 are mounted on the waveguides D3 and D4, respectively.

Further, the junction C0, which is constructed in the same manner as that of the third embodiment (FIG. 12), comprises a front partial junction C3, front partial junction C4 with electrode, central partial junction C5, rear partial junction C6 with electrode, and rear partial junction C7, these individual partial junctions having the same lengths as their counterparts according to the third embodiment. As described before in connection with the third embodiment with reference to FIG. 5 and FIGS. 13 to 16, electrodes F1, F2, F3 and F4 are mounted on the partial junctions C4 and C6 in an inverted $\Delta\beta$ configuration.

In the present embodiment, a combination of the incidence-side lead section C1 and the front partial junction C3 constitutes a new equivalent incidence-side lead section (C1+C3), and a combination of the emergence-side lead section C2 and the rear partial junction C7 constitutes a new equivalent emergence-side lead section (C2+C7).

Thus, as in the case of the third embodiment, the coefficients p1 and p3, among the coefficients p1, p2 and p3 for defining the respective lengths of the individual partial junctions, are selected as values such that the state of coupling at the equivalent incidence-side lead section (C1+C3) agrees with the state of coupling at the equivalent emergence-side lead section (C2+C7), so that the coupling at the equivalent incidence-side lead section (C1+C3) and that of the equivalent emergence-side lead section (C2+C7) cancel each other, whereby the whole device can equivalently enjoy perfectly symmetrical incidence- and emergence-side lead sections.

As in the case of the third embodiment, moreover, the coefficient p2 is adjusted to a value such that the central partial junction C5 has a length corresponding to a maximum value of the extinction ratio for the through mode. Thus, a state of coupling can be obtained which is equivalent to the sum of the individual states of coupling at the incidence-side lead section C1, the front and rear partial junctions C3 and C7, and the emergence-side lead section C2.

Further, gaps g1 to g10, identical with the ones described before in connection with the third embodiment, and similar gaps 11 and 12 are formed between the electrodes and the control means mounted on the individual partial junctions.

In the optical device according to the present embodiment, the individual coupling or connections are caused to cancel each other by the agency of the equivalent incidence-side lead section (C1+C3), formed of the incidence-side lead section C1 and the front partial junction C3, and the equivalent emergence-side lead section (C2+C7), formed of the emergence-side lead section C2 and the rear partial junction C7. Accordingly, the whole device can enjoy the perfectly symmetrical incidence- and emergence-side lead sections. Thus, the extinction ratio for the cross mode can be prevented from lowering.

The central partial junction C5 is adjusted to a length such that the extinction ratio for the through mode has a maximum. In this case, the theoretical extinction ratio for the through mode is 60 dB or more.

By activating the control means K9 and K10 mounted on the incidence-side lead section C1 and the control means K7 and K8 mounted on the emergence-side lead section C2, moreover, the deviation between the actual and theoretical states of coupling at each partial junction, attributable to variation in dimensional accuracy in the manufacture of the device, can be adjusted to restore the device to a high-extinction state.

Thus, the optical device of the present embodiment can enjoy much higher extinction ratios for both the cross and through modes than the conventional ones.

Figure 23:
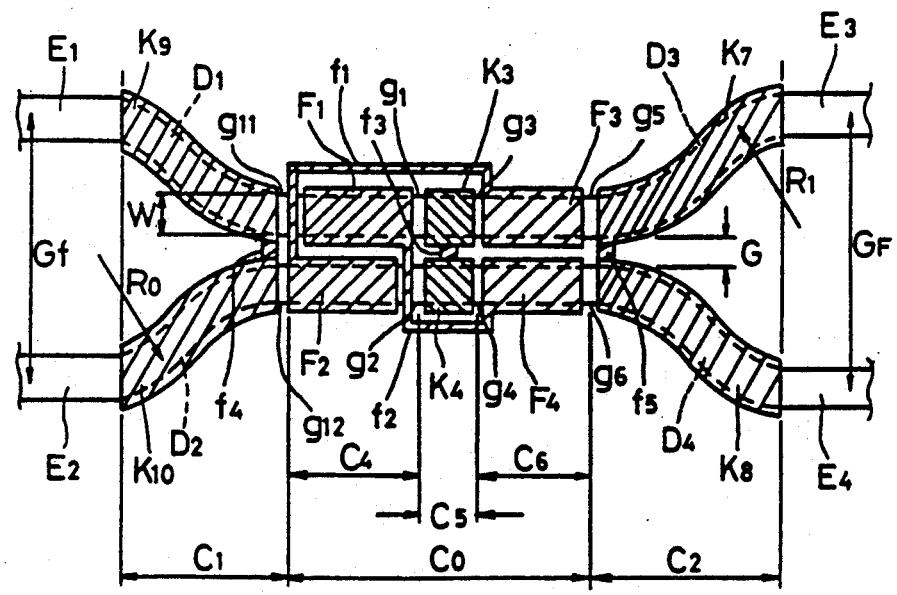
FIG. 23 is a plane pattern diagram showing a modification of the optical device according to the fourth embodiment.

Referring now to FIG. 23, a modification of the optical device according to the fourth embodiment will be described.

The optical device according to this modification is a modified version of the device shown in FIG. 22 in which $p1=p3=0$ is given, that is, the respective incidence ends A1 and B1 and emergence ends A2 and B2 of the optical waveguides A and B are optically connected directly to their corresponding curved optical waveguides D1, D2, D3 and D4 without the use of the front and rear partial junctions.

In FIG. 23, the length of the junction C0, the distance G between the optical waveguides A and B, the distance GF between the through port E3 and the cross port E4, the distance Gf between the incidence ports E1 and E2, and the respective curvature radii R0 and R1 of the curved optical waveguides D1 and D2 and the waveguides D3 and D4 are all identical with those of the device shown in FIG. 17.

The length, $p2 \times L$, of the central partial junction C5 is 540 μm ($p2=0.0675$), and the respective lengths of the front partial junction C4 with electrode and the rear partial junction C6 with electrode are both 3.73 mm.

The front and rear partial junctions C4 and C6 with electrode at the junction C0 and the incidence- and emergence-side lead sections C1 and C2 are constructed or formed in the same or like manner as those of the first embodiment (FIG. 7) or the third embodiment (FIG. 18), so that a description of their constructions and the forming methods therefor is omitted.

Figure 24:
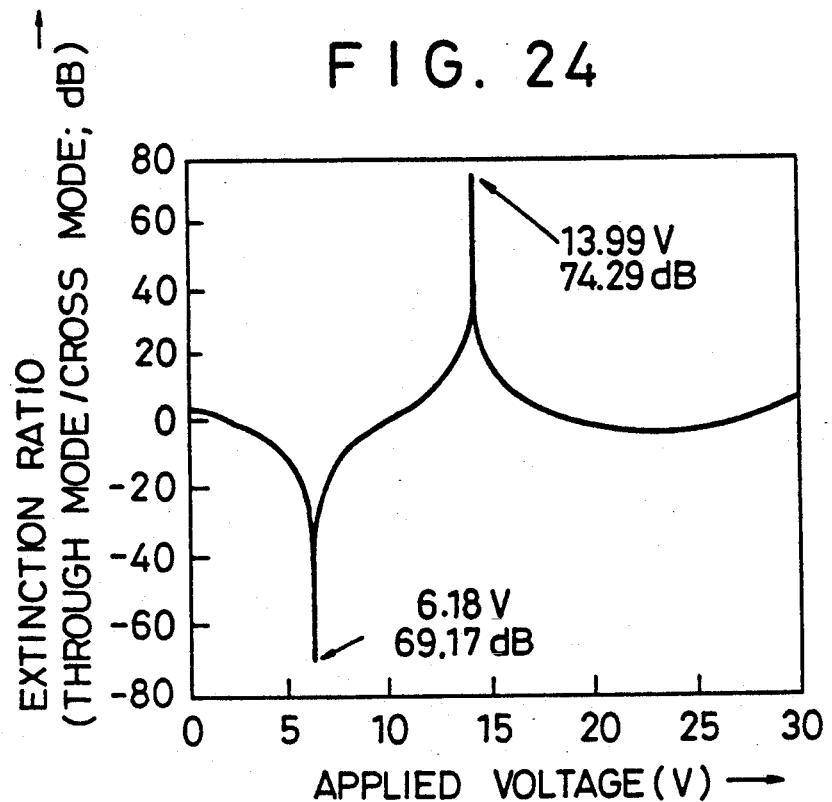
FIG. 24 shows a theoretical characteristic curve representing the switching characteristic of the device according to the modification shown in FIG. 23.

FIG. 24 shows a theoretical characteristic curve representing the switching characteristic of this device obtained when a TE mode light beam with a wavelength of 1.3 μm is excited at the incidence port E1, and when only the electrooptical effect is developed by applying reverse bias voltage to the electrodes.

When the device is actually driven by means of the reverse bias voltage, the extinction ratio can be estimated at 30 dB or more if the applied voltage in the cross mode is $-7$ V or if the applied voltage in the through mode is $-15$ V, in view of the conditions of a measurement system.

Figure 25:
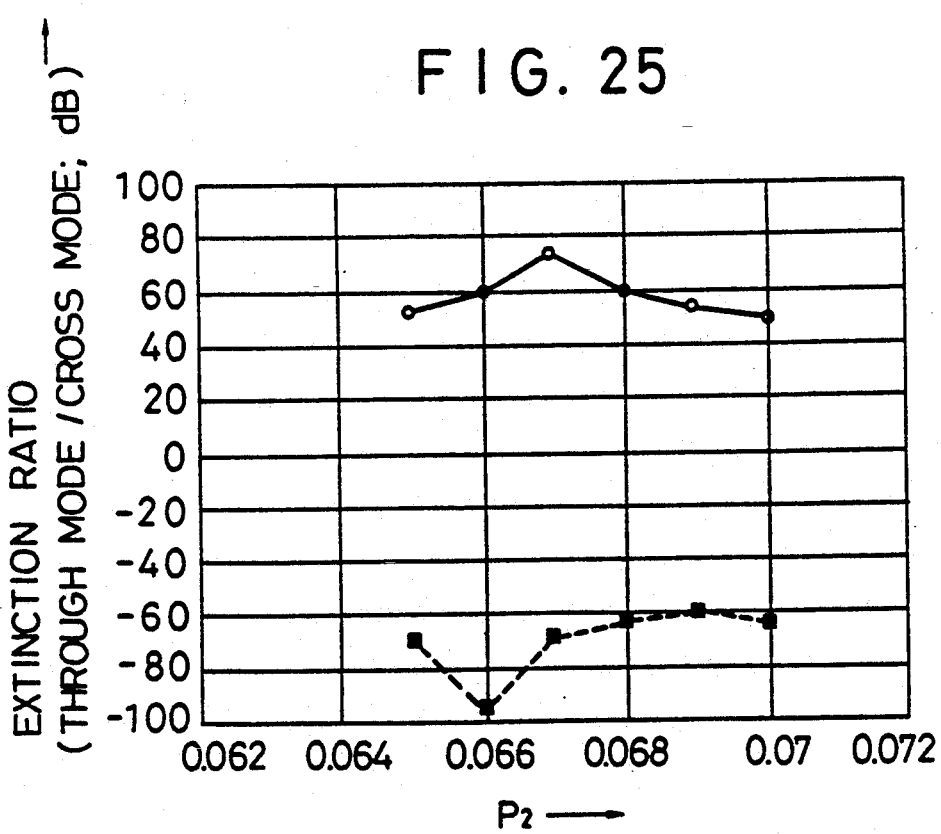
FIG. 25 is a graph showing the relationships between the coefficient p2 and extinction ratio obtained with use of $p1=p3=0$, in the device according to the modification shown in FIG. 23.

FIG. 25 shows the relationship between the fluctuation of the extinction ratio and the coefficient p2 of the device observed when the coefficient p2 is varied to change the length, $p2 \times L$, of the central partial junction C5. In FIG. 25, circles and black squares represent the through mode and the cross mode, respectively.

Theoretically, as seen from FIG. 25, this device can enjoy the extinction ratio of 60 dB or more without regard to the mode, through or cross, if the central partial junction C5 is formed with the value p2 ranging from 0.066 to 0.068.

It is evident from FIG. 25, moreover, that the coefficients p1, p2 and p3 should be selected at certain values for the maximum extinction ratio of the device.

If Gf, GF, G, R0, R1 and W are set at the values described before in connection with the second and third embodiments, for example, the extinction ratio for the cross mode inevitably lowers unless $p1=0$ and $p3=0$ are established. If p2 is deviated from 0.0675, moreover, it is impossible to obtain the maximum extinction ratio, 74.29 dB, for the through mode.

When the value p2 at least varies from 0.0675 to 0.062 or less, as seen from FIG. 25, the extinction ratio of this device lowers from its maximum value to 30 dB or less. More specifically, the extinction ratio of the device lowers to 30 dB or less if the dimensional parameter of the central partial junction C5 with the length of $p2 \times L$ is deviated 44 μm from a preset theoretical value for the waveguide ridge depth h of 1.0 μm.

Usually, as mentioned before, the device is manufactured by combining photolithography and etching, and the accuracy of a photomask used in this case is controlled to be 1 μm or less. It is technically possible, therefore, to control the accuracy of the dimensional parameter for the length of the central partial junction C5 within the range of the aforesaid allowable value, 44 μm.

However, the depth h of the ridge formed by etching has a great influence upon the extinction ratio.

The relationship between the etching residue, $1.0-h$ (μm), and the coefficient p2 for the maximum extinction ratio, obtained as the ridge depth h of the device is varied, is identical with the one shown in FIG. 21.

Where the ridge depth h is deviated, for example, $\pm 0.05$ μm from 1.0 μm, as seen from FIG. 21, the optimum length of the central partial junction C5 for the maximum extinction ratio must be changed from the preset value, 540 μm, for the depth h of 1.0 μm to 608 or 496 μm.

Let it be supposed that the actual ridge depth h of the device of FIG. 23 is about 0.95 μm, which is about 0.05 μm shorter than the preset depth, even though the device is manufactured with the target value of the ridge depth h at 1.0 μm and the individual dimensional parameters set as aforesaid. In this case, the whole structure is kept symmetrical in the cross mode, so that the extinction ratio of the device is 30 dB or more if the voltage applied to the electrodes F1 to F4 is $-7$ V, in view of the conditions of the measurement system, all the same. In the through mode, however, the maximum extinction ratio obtained with use of the applied voltage of $-15$ V is about 25 dB, which is much lower than the theoretical value.

A reverse voltage of about $-16$ V was applied to the control means (electrodes) K9 and K10 of the incidence-side lead section C1, the control means (electrodes) K3 and K4 of the central partial junction C5, and the control means (electrodes) K7 and K8 of the emergence-side lead section C2, and at the same time, a reverse voltage of $-15$ V was applied to the electrodes F1 to F4. Thereupon, a through mode with the extinction ratio of 30 dB or more was obtained.

This is attributable to the following result. The electrooptical effect of the optical waveguides was developed by the applied reverse voltage, at the incidence-side lead section C1, central partial junction C5, and emergence-side lead section C2, so that the respective refractive indexes of the waveguides were increased. Accordingly, light was confined so tight that the coupling coefficient between the paired optical waveguides was lowered. Thus, the length, $p_2 \times L$, of the central partial junction C5 increased from 496 $\mu$m, which corresponds to h=0.95 $\mu$m, and equivalently approached the preset value 540 $\mu$m, which corresponds to h=1.0 $\mu$m.

If the ridge depth h is increased, it is necessary only that the length of the partial junction C5 be equivalently shortened in the manner described before in connection with the third embodiment.

In the optical devices according to the fourth embodiment and its modification, as seen from the above description, deterioration of the extinction ratio for the cross mode, attributable to the asymmetry of coupling between the incidence- and emergence-side lead sections of the conventional directional couplers, or to the variation in accuracy of the dimensional parameters during the manufacture, can be removed by properly designing the state of coupling at the equivalent incidence-side lead section, formed of the incidence-side lead section and the front partial junction, and the state of coupling at the equivalent emergence-side lead section, formed of the rear partial junction and the emergence-side lead section. Since the central partial junction is formed having a length such that the extinction ratio for the through mode has its maximum, moreover, the through-mode extinction ratio can be also kept high. In other words, the optical devices of the fourth embodiment and its modification exhibit a high extinction ratio for either of the through and cross modes.

In the various embodiments and modifications described above, the optical device of the present invention is driven as an optical switch. Alternatively, however, it may be used as a polarizing splitter which simultaneously performs, for example, injection of forward current from the electrodes and application of reverse voltage, thereby separating a TE mode light beam from a TM mode light beam. Further, the device can be used as an optical modulator or light-wave divisional multiplexer with high extinction ratio characteristics.

What is claimed is:

1. A directional coupler type optical device, comprising:
    an interaction region including two first optical waveguides with equal propagation constants arranged parallel to each other, and propagation constant control means on the first optical waveguides for controlling the respective propagation constants of the first optical waveguides;
    an incidence-side lead region including a second optical waveguide optically connected to an incidence end of one of the two first optical waveguides;
    an emergence-side lead region including two third optical waveguides each optically connected at one end thereof to an emergence end of a corresponding one of said two first optical waveguides, said third optical waveguides diverging from each other with a suitable distance between them such that sufficient spacing for fiber connections is provided; and
    coupling control means on the emergence-side lead region for controlling coupling between the two third optical waveguides.

2. An optical device according to claim 1, wherein said second optical waveguide of said incidence-side lead region comprises one straight optical waveguide, so that said optical device functions as a 1-input/2-output directional coupler type optical device.

3. An optical device according to claim 1, wherein:
    said incidence-side lead region comprises two second optical waveguides which have a suitable distance between them such that sufficient spacing for fiber connection is provided;
    said two second optical waveguides are bent toward each other to be in close proximity wherein one end of each of said two second optical waveguides is optically connected to the incidence end of a corresponding one of the two first optical waveguides, so that said optical device functions as a 2-input/2-output directional coupler type optical device; and
    said optical device further comprises second coupling control means on the incidence-side lead region for controlling coupling between the two second optical waveguides.

4. An optical device according to claim 2, wherein said two first optical waveguides of said interaction region each have a length L, and are further divided into five partial coupling regions, including:
    a first partial coupling region of a predetermined length $p_1 \times L$ with third coupling control means extended substantially thereover;
    a second partial coupling region of a length $(1-p_1-p_2-p_3) \times L/2$ with propagation constant control means extended substantially thereover;
    a third partial coupling region of a predetermined length $p_2 \times L$ with third coupling control means extended substantially thereover;
    a fourth partial coupling region with propagation constant control means extended substantially thereover, the length thereof being approximately the same length as that of the second partial coupling region;
    a fifth partial coupling region of predetermined length $p_3 \times L$ with third coupling control means extended substantially thereover;
    said third coupling control means on the first, third, and fifth partial coupling region controlling coupling between corresponding portions of the two first optical waveguides; and
    said propagation constant control means on the second and fourth partial coupling region controlling propagation constants thereof such that a change of propagation constant in one is always in a sign opposite to the other; and
    said $p_1$, $p_2$, and $p_3$ being decimals or zero satisfying a relation $p_1+p_2+p_3<1$ ($p_1$, $p_2 \neq 0$).

5. An optical device according to claim 3, wherein said two first optical waveguides of said interaction region each have a length L, and are further divided into five partial coupling regions, including:
    a first partial coupling region of a predetermined length $p_1 \times L$ with third coupling control means extended substantially thereover;
    a second partial coupling region of a length $(1-p_1-p_2-p_3) \times L/2$ with propagation constant control means extended substantially over; a third partial coupling region of a predetermined length $p_2 \times L$ with third coupling control means extended substantially thereover;
    a fourth partial coupling region with said propagation constant control means extended substantially thereover; the length thereof being approximately the same length as that of the second partial coupling region;

a fifth partial coupling region of predetermined length $p_3 \times L$ with third coupling control means extended substantially thereover;

said third coupling control means on the first, third, and fifth partial coupling region controlling coupling between corresponding portions of the two first optical waveguides; and said propagation constant control means on the second and fourth partial coupling region controlling propagation constants thereof such that a change of propagation constant in one is always in a sign opposite to the other; and said $p_1$, $p_2$, and $p_3$ being decimals or zero satisfying a relation $p_1 + p_2 + p_3 < 1$ ($p_2 \neq 0$).

6. An optical device according to claim 1, wherein said coupling control means comprises mode coupling suppressing means mounted on each of said two third optical waveguides.

7. An optical device according to claim 1, wherein each said third optical waveguide comprises a curved optical waveguide.

8. An optical device according to claim 1, wherein said third optical waveguides, from their respective connections at respective one ends thereof to said first optical waveguides, diverge away from each other in said emergence-side lead region such that there is sufficient spacing between said third optical waveguides for fiber connections.

9. An optical device according to claim 1, wherein each of said first optical waveguides comprises one of a material having an electro-optical effect or band filling effect and a material having a structure such that a refractive index thereof is controllable by introduction of an electrical signal.

10. An optical device according to claim 3, wherein said two first optical waveguides have equal widths.

11. An optical device according to claim 3, wherein said coupling control means comprises mode coupling suppressing means mounted on each of said two third optical waveguides.

12. An optical device according to claim 3, wherein said second coupling control means comprises second mode coupling suppressing means mounted on each of said two second optical waveguides.

13. An optical device according to claim 2, wherein said coupling control means comprises mode coupling suppressing means mounted on each of said two third optical waveguides.

14. An optical device according to claim 2, wherein said two first optical waveguides have equal widths.

15. An optical device according to claim 5, wherein each of said second optical waveguides comprises a curved optical waveguide.

16. An optical device according to claim 5, wherein said two first optical waveguides have equal widths.

17. An optical device according to claim 5, wherein said coupling control means includes means for controlling at least one of a coupling coefficient and a state of coupling between said two third optical waveguides.

18. An optical device according to claim 5, wherein said second coupling control means includes means for controlling at least one of a coupling coefficient and a state of coupling between said two second optical waveguides.

19. An optical device according to claim 5, wherein said third coupling control means includes means for controlling at least one of a coupling coefficient or a state of coupling between corresponding partial coupling region of said two first optical waveguides.

20. An optical device according to claim 4, wherein said two first optical waveguides have equal widths.

21. An optical device according to claim 4, wherein said coupling control means includes means for controlling at least one of a coupling coefficient and a state of coupling between said two third optical waveguides.

22. An optical device according to claim 4, wherein said third coupling control means includes means for controlling at least one of a coupling coefficient or a state of coupling between corresponding partial coupling region of said two first optical waveguides.

23. A driving method for a 1-input/2-output directional coupler type optical device, said optical device comprising:

an interaction region including two first optical waveguides with equal propagation constants arranged parallel to each other, and propagation constant control means on said first optical waveguides for controlling the respective propagation constants of said first optical waveguides;

an incidence-side lead region comprising a second optical waveguide including one straight optical waveguide optically connected to an incidence end of one of said two first optical waveguides;

an emergence-side lead region including two third optical waveguides each optically connected at each one end thereof to an emergence end of a corresponding one of said two first optical waveguides, said two third optical waveguides diverging relative to each other with a suitable distance between them such that sufficient spacing for fiber connection is provided; and coupling control means for controlling coupling between said two third optical waveguides, said coupling control means including mode coupling suppressing means individually mounted on each of said third optical waveguides;

and said driving method comprising the steps of:

applying an electrical signal to the propagation constant control means; and activating one of said mode coupling suppressing means while applying said electrical signal, thereby establishing a high extinction ratio for both a through and a cross switching state.

24. A driving method according to claim 23, comprising activating said mode coupling suppressing means such that the mode coupling is zero.

25. A driving method for a 2-input/2-output directional coupler type optical device, said optical device comprising:

an interaction region comprising two first optical waveguide with equal propagation constants arranged parallel to each other, and propagation constant control means on said first optical waveguides for controlling the respective propagation constants of said first optical waveguides;

an incidence-side lead region comprising two second optical waveguides with a suitable distance between them such that sufficient spacing for fiber connection is provided, wherein said two second optical waveguides are bent toward each other to be in close proximity wherein one end of each of said two second optical waveguides is optically connected to an incidence end of a corresponding one of said two first optical waveguides;

an emergence-side lead region comprising two third optical waveguides each optically connected at one end thereof to an emergence end of a corresponding one of said two first optical waveguides, said two third optical waveguides diverging from each other with a suitable distance between them such that sufficient spacing for fiber connection is provided; and first coupling control means for controlling coupling between said two third optical waveguides, and second coupling control means for controlling coupling between said two second optical waveguides, said first coupling control means including first mode coupling suppressing means individually mounted on each of said third optical waveguides, and said second coupling control means including second mode coupling suppressing means mounted on each of said second optical waveguides, and said driving method comprising the steps of:
applying an electrical signal to said propagation constant control means; and
activating one of said second mode coupling suppressing means which is mounted on a one of said two second optical waveguides upon which no light is incident, and activating a required one of said first mode coupling suppressing means, while applying said electrical signal, thereby establishing a high extinction ratio for both a through and a cross switching state.

26. A driving method according to claim 25, comprising activating said one required first mode coupling suppressing means and said second mode coupling suppressing means such that the mode coupling is zero.

* * * * *